US009457792B2

(12) United States Patent
Bradley et al.

(10) Patent No.: US 9,457,792 B2
(45) Date of Patent: Oct. 4, 2016

(54) RETROFITTING A VEHICLE DRIVE TRAIN

(71) Applicant: Clean Emissions Technologies, Inc., Eastland, TX (US)

(72) Inventors: Bill C. Bradley, Dallas, TX (US); Joel Craig Diehl, Austin, TX (US); Dan Warner Harris, Aurora, CO (US); Warner Olan Harris, Banning, CA (US); Wayne Turnbow, Centennial, CO (US)

(73) Assignee: Clean Emissions Technologies, Inc., Eastland, TX (US)

( * ) Notice: Subject to any disclaimer, the term of this patent is extended or adjusted under 35 U.S.C. 154(b) by 240 days.

(21) Appl. No.: 14/057,991

(22) Filed: Oct. 18, 2013

(65) Prior Publication Data

US 2014/0041179 A1 Feb. 13, 2014

Related U.S. Application Data

(60) Division of application No. 12/721,537, filed on Mar. 10, 2010, now Pat. No. 8,565,969, which is a continuation-in-part of application No. 12/060,368, filed on Apr. 1, 2008, now Pat. No. 7,921,945.

(60) Provisional application No. 61/242,370, filed on Sep. 14, 2009, provisional application No. 61/224,611, filed on Jul. 10, 2009.

(51) Int. Cl.

| | |
|---|---|
| ***B60L 9/00*** | (2006.01) |
| ***B60L 11/00*** | (2006.01) |

(Continued)

(52) U.S. Cl.

CPC ................ *B60W 10/30* (2013.01); *B60K 6/48* (2013.01); *B60K 6/547* (2013.01); *B60W 10/02* (2013.01);

(Continued)

(58) Field of Classification Search

CPC combination set(s) only.
See application file for complete search history.

(56) References Cited

U.S. PATENT DOCUMENTS

| | | | |
|---|---|---|---|
| 1,726,760 | A | 9/1929 | Otwell |
| 2,467,398 | A | 4/1949 | Miller |

(Continued)

FOREIGN PATENT DOCUMENTS

| | | |
|---|---|---|
| CA | 2643165 | 8/2007 |
| CN | 1420034 | 5/2003 |

(Continued)

OTHER PUBLICATIONS

Broderick et al., "Demonstration of Proton Exchange Membrane Fuel Cell as an Auxiliary Power Source for Heavy Trucks," SAE Transactions, 2000, vol. 109, Previously Presented 783-788, NY, NY.

(Continued)

*Primary Examiner* — Bhavesh V Amin
(74) *Attorney, Agent, or Firm* — Kelly Kordzik; Matheson Keys Daffer and Kordzik PLLC

(57) ABSTRACT

A vehicle includes a drive train having a manual transmission. An internal combustion engine is coupled to the manual transmission via a clutch. The vehicle is retrofitted so that auxiliary devices operate auxiliary systems of the vehicle, a battery energizes electric drivers for the auxiliary devices, a power exchange unit is coupled to the manual transmission via a power takeoff port, an electric generator is coupled to the power exchange unit, and the internal combustion engine drives the electric generator via the power exchange unit. The battery is energized by the electric generator via a battery charger.

22 Claims, 17 Drawing Sheets

(51) Int. Cl.

| | |
|---|---|
| ***B60W 10/30*** | (2006.01) |
| ***B60K 6/48*** | (2007.10) |
| ***B60K 6/547*** | (2007.10) |
| ***B60W 10/02*** | (2006.01) |
| ***B60W 10/08*** | (2006.01) |
| ***B60W 10/11*** | (2012.01) |
| ***B60W 30/19*** | (2012.01) |
| *B60K 17/28* | (2006.01) |
| *B60W 10/06* | (2006.01) |
| *B60W 20/00* | (2016.01) |

(52) U.S. Cl.

CPC .............. *B60W 10/08* (2013.01); *B60W 10/11* (2013.01); *B60W 30/19* (2013.01); *B60K 17/28* (2013.01); *B60W 10/06* (2013.01); *B60W 20/00* (2013.01); *B60Y 2200/14* (2013.01); *Y02T 10/6221* (2013.01); *Y02T 10/6286* (2013.01); *Y10T 29/49716* (2015.01); *Y10T 477/79* (2015.01)

(56) References Cited

U.S. PATENT DOCUMENTS 2,677,251 A 5/1954 Clark et al.
2,810,293 A 10/1957 George
2,923,171 A 2/1960 George
2,930,242 A 3/1960 George
3,209,604 A 10/1965 Mitchell
3,241,628 A 3/1966 Thomas
3,597,935 A 8/1971 Pierrat
3,599,814 A 8/1971 Brownfield
3,646,773 A 3/1972 Falk
3,716,768 A 2/1973 Mason
3,789,962 A 2/1974 Frangiudakis
3,792,327 A 2/1974 Waldorf
3,882,950 A 5/1975 Strohlein
4,193,271 A 3/1980 Honigsbaum
4,199,037 A * 4/1980 White ...................... 180/65.245
4,271,677 A 6/1981 Harr
4,280,330 A 7/1981 Harris
4,438,342 A 3/1984 Kenyon
4,448,157 A 5/1984 Eckstein
4,461,988 A 7/1984 Plunkett
4,470,476 A 9/1984 Hunt
4,488,447 A 12/1984 Gebhardt
4,531,379 A 7/1985 Diefenthaler et al.
4,588,040 A 5/1986 Albright, Jr.
4,658,599 A 4/1987 Kajiwara
4,711,204 A 12/1987 Rusconi
4,712,636 A 12/1987 Ishimatsu
4,732,229 A 3/1988 Lucht
4,825,663 A 5/1989 Nijjar
4,828,452 A 5/1989 Bolitho
4,846,327 A 7/1989 Mayer
4,947,657 A 8/1990 Kalmbach
4,976,114 A 12/1990 Manning
RE33,687 E 9/1991 Greer
5,046,326 A 9/1991 Havemann
5,048,657 A 9/1991 Dissett
5,049,112 A 9/1991 Gunsing
5,190,118 A 3/1993 Yelton
5,255,733 A 10/1993 King
5,267,635 A 12/1993 Peterson
5,301,764 A 4/1994 Gardner
5,307,645 A 5/1994 Pannell
5,343,970 A 9/1994 Severinsky
5,346,031 A 9/1994 Gardner
5,522,778 A 6/1996 Iwase
5,558,588 A 9/1996 Schmidt
5,631,532 A 5/1997 Azuma et al.
5,637,987 A 6/1997 Fattic
5,644,200 A 7/1997 Yang
5,653,302 A 8/1997 Edye et al.
5,656,921 A 8/1997 Farrall
5,667,029 A 9/1997 Urban
5,669,842 A 9/1997 Schmidt
5,722,911 A 3/1998 Ibaraki
5,755,303 A 5/1998 Yamamoto
5,773,904 A 6/1998 Schiebold
5,775,449 A 7/1998 Moroto
5,799,632 A 9/1998 Bennett
5,799,744 A 9/1998 Yamaguchi
5,800,132 A 9/1998 Marietti
5,801,499 A 9/1998 Tsuzuki
5,806,617 A 9/1998 Yamaguchi
5,810,321 A 9/1998 Presson
5,815,824 A 9/1998 Saga
5,823,282 A 10/1998 Yamaguchi
5,841,201 A 11/1998 Tabata
5,842,534 A 12/1998 Frank
5,845,731 A 12/1998 Buglione
5,847,469 A 12/1998 Tabata
5,862,497 A 1/1999 Yano
5,881,564 A 3/1999 Kishimoto
5,887,670 A 3/1999 Tabata
5,896,750 A 4/1999 Karl
5,927,953 A 7/1999 Marietti
5,942,879 A 8/1999 Ibaraki
5,951,614 A 9/1999 Tabata
6,009,371 A 12/1999 Kobayashi
6,027,032 A 2/2000 Aoki et al.
6,038,877 A 3/2000 Peiffer
6,059,059 A 5/2000 Schmidt-Brucken
6,080,081 A 6/2000 Sauermann
6,112,151 A 8/2000 Kruse
6,138,788 A 10/2000 Bohner
6,151,891 A 11/2000 Bennett
6,155,364 A 12/2000 Nagano
6,164,400 A 12/2000 Jankovic
6,166,631 A 12/2000 Kennedy et al.
6,186,255 B1 2/2001 Shimasaki et al.
6,209,672 B1 4/2001 Severinsky
6,238,814 B1 5/2001 Horiguchi et al.
6,251,046 B1 6/2001 Yoshino et al.
6,260,539 B1 7/2001 Minowa
6,269,713 B1 8/2001 Ohke
6,276,161 B1 8/2001 Peiffer
6,318,486 B2 11/2001 Masaki
6,332,257 B1 * 12/2001 Reed et al. .................. 29/401.1
6,338,391 B1 1/2002 Severinsky
6,340,339 B1 1/2002 Tabata
6,351,957 B2 3/2002 Hara et al.
6,367,570 B1 4/2002 Long, III
6,405,818 B1 6/2002 Anthony
6,419,040 B2 7/2002 Kitano
6,427,100 B1 7/2002 Kaku
6,428,438 B1 * 8/2002 Bowen .............................. 475/5
6,441,506 B2 8/2002 Nakashima
6,460,500 B1 * 10/2002 Ooyama et al. ........... 123/179.3
6,480,767 B2 11/2002 Yamaguchi
6,484,831 B1 11/2002 Gauthier
6,488,345 B1 12/2002 Woody
6,488,609 B1 12/2002 Morimoto
6,504,259 B1 1/2003 Kuroda et al.
6,519,513 B2 2/2003 Nakagawa
6,520,160 B2 2/2003 Kojima
6,533,692 B1 3/2003 Bowen
6,554,088 B2 4/2003 Severinsky
6,557,655 B2 5/2003 Ovshinsky
6,558,290 B2 5/2003 Phillips
6,558,827 B1 5/2003 Reiser et al.
6,570,265 B1 5/2003 Shiraishi
6,591,705 B1 7/2003 Reik et al.
6,616,059 B2 9/2003 Sabhapathy et al.
6,616,569 B2 9/2003 Hoang
6,629,027 B2 9/2003 Yamaguchi
6,638,195 B2 10/2003 Williams
6,651,759 B1 11/2003 Gruenwald
6,655,488 B2 12/2003 Braud
6,658,852 B2 12/2003 Frey
6,664,651 B1 12/2003 Kotre
6,672,415 B1 1/2004 Tabata
6,687,603 B2 2/2004 Wakashiro

(56) References Cited

U.S. PATENT DOCUMENTS 6,688,411 B2 2/2004 Boggs
6,692,403 B2 2/2004 Charaudeau
6,694,232 B2 2/2004 Saito
6,697,717 B2 2/2004 Shioda et al.
6,705,416 B1 3/2004 Glonner
6,712,165 B1 3/2004 Okazaki
6,721,637 B2 4/2004 Abe
6,735,502 B2 5/2004 Phillips
6,740,987 B2 5/2004 Kitajima
6,745,117 B1 6/2004 Thacher
6,768,932 B2 7/2004 Claypole
6,781,251 B2 8/2004 Takaoka
6,787,932 B2 9/2004 Takaoka
6,796,367 B2 9/2004 Blacquiere
6,802,291 B2 10/2004 Ujifusa
6,805,211 B2 10/2004 Fujikawa
6,808,470 B2 10/2004 Boll
6,840,341 B2 1/2005 Fujikawa
6,851,470 B2 2/2005 Laukhuf
6,857,985 B2 2/2005 Williams
6,862,511 B1 3/2005 Phillips
6,867,509 B1 3/2005 Takaoka
6,868,927 B2 3/2005 Boll
6,881,167 B2 4/2005 Inada
6,892,541 B2 5/2005 Suzuki
6,907,337 B2 6/2005 Phillips
6,915,198 B2 7/2005 Phillips
6,921,984 B2 7/2005 Rogg
6,966,868 B2 11/2005 Stork
6,986,398 B2 1/2006 Obayashi
6,986,645 B2 1/2006 Iwanami
6,991,053 B2 1/2006 Kuang
6,994,177 B2 2/2006 Ito
6,994,360 B2 2/2006 Kuang
6,998,727 B2 2/2006 Gray
7,004,273 B1 2/2006 Gruenwald
7,021,409 B2 4/2006 Tamor
7,035,727 B2 4/2006 De La Salle
7,055,337 B2 6/2006 Horn
7,055,636 B2 6/2006 Komiyama
7,062,371 B2 6/2006 Gault et al.
7,091,839 B2 8/2006 Situ
7,102,313 B2 9/2006 Kadota
7,104,347 B2 9/2006 Severinsky
7,104,920 B2 9/2006 Beaty
7,107,776 B2 9/2006 Ikura
7,111,704 B2 9/2006 Johnson
7,130,766 B2 10/2006 Tanase
7,135,785 B2 11/2006 Kropp
7,143,851 B2 12/2006 Masterson
7,147,072 B2 12/2006 Botti
7,223,200 B2 5/2007 Kojima
7,237,634 B2 7/2007 Severinsky
7,240,749 B2 7/2007 Bhavsar
7,273,119 B2 9/2007 Tsuneyoshi
7,275,610 B2 10/2007 Kuang
7,284,594 B2 10/2007 Sanada et al.
7,285,869 B2 10/2007 Syed
7,301,302 B2 11/2007 Yoshii
7,306,064 B2 12/2007 Imazu
7,315,090 B2 1/2008 Yang
7,392,871 B2 7/2008 Severinsky
7,395,787 B1 7/2008 Claypole et al.
7,407,026 B2 8/2008 Tamor
7,455,134 B2 11/2008 Severinsky
7,469,758 B2 12/2008 Iwanaka
7,469,858 B2 12/2008 Edelson
7,487,852 B2 2/2009 Leone
7,497,198 B2 3/2009 Leone
7,506,711 B2 3/2009 Usoro
7,520,353 B2 4/2009 Severinsky
7,543,454 B2 6/2009 Harris
7,551,064 B2 6/2009 Pudelko et al.
7,559,388 B2 7/2009 Severinsky
7,580,808 B2 8/2009 Bos
7,600,595 B2* 10/2009 Harris ........................ 180/65.31
7,681,676 B2* 3/2010 Kydd ......................... 180/65.21
7,921,945 B2 4/2011 Harris
7,921,950 B2 4/2011 Harris
8,346,603 B2 1/2013 Sakakibara et al.
8,386,148 B2 2/2013 Hyde et al.
2001/0005807 A1 6/2001 Kitajima et al.
2001/0022245 A1 9/2001 Rogg
2001/0025220 A1 9/2001 Kaneko et al.
2001/0039230 A1 11/2001 Severinsky
2002/0025220 A1 2/2002 Okuda
2002/0040818 A1 4/2002 Maruyama
2002/0116113 A1 8/2002 Kaneko
2003/0041684 A1 3/2003 Jones, Jr. et al.
2003/0055665 A1 3/2003 Fleming
2003/0062205 A1 4/2003 Konrad
2003/0162631 A1 8/2003 Williams
2003/0217876 A1 11/2003 Severinsky
2004/0093264 A1 5/2004 Shimizu
2004/0157704 A1 8/2004 Stork
2004/0160319 A1 8/2004 Joao
2004/0200648 A1 10/2004 Tarasinski
2004/0207205 A1 10/2004 Kikuchi
2005/0043486 A1 2/2005 Okuno
2005/0060076 A1 3/2005 Phillips
2005/0060079 A1 3/2005 Phillips
2005/0060080 A1 3/2005 Phillips
2005/0107198 A1 5/2005 Sowul et al.
2005/0109550 A1 5/2005 Buglione
2005/0113202 A1 5/2005 Miller
2005/0115748 A1 6/2005 Lanier
2005/0173523 A1 8/2005 Yushio et al.
2005/0211479 A1 9/2005 Tamor
2005/0224264 A1 10/2005 Perrin
2005/0231033 A1* 10/2005 Ganzel .......................... 303/152
2005/0251299 A1 11/2005 Donnelly et al.
2006/0000650 A1* 1/2006 Hughey ....................... 180/65.2
2006/0030450 A1* 2/2006 Kyle ................................ 477/3
2006/0058932 A1 3/2006 Garg et al.
2006/0100057 A1 5/2006 Severinsky
2006/0108161 A1 5/2006 Feliss
2006/0111828 A1 5/2006 Alvarez et al.
2006/0129289 A1 6/2006 Kumar et al.
2006/0207274 A1 9/2006 Harris
2006/0213704 A1 9/2006 Mack
2006/0231304 A1 10/2006 Severinsky
2006/0231305 A1 10/2006 Severinsky
2006/0231306 A1 10/2006 Severinsky
2006/0237246 A1 10/2006 Severinsky
2006/0237247 A1 10/2006 Severinsky
2006/0258505 A1 11/2006 Vafidis
2007/0030450 A1 2/2007 Liang
2007/0056784 A1 3/2007 Joe
2007/0080005 A1 4/2007 Joe
2007/0107956 A1 5/2007 Matsubara
2007/0107958 A1 5/2007 Oliver
2007/0124037 A1 5/2007 Moran
2007/0137909 A1 6/2007 Zillmer et al.
2007/0169970 A1 7/2007 Kydd
2007/0181355 A1* 8/2007 Harris .......................... 180/65.2
2007/0199533 A1 8/2007 Takahashi
2007/0246274 A1 10/2007 Dreibholz
2007/0272456 A1 11/2007 Shiiba
2007/0278022 A1 12/2007 Tanishima
2008/0000700 A1 1/2008 Kotani
2008/0006467 A1 1/2008 Morishita
2008/0012535 A1 1/2008 Takatsuji
2008/0029319 A1 2/2008 Fleckner
2008/0029320 A1 2/2008 Fleckner
2008/0076616 A1 3/2008 Kidokoro
2008/0096711 A1 4/2008 Smith
2008/0100129 A1 5/2008 Lubbers
2008/0154671 A1 6/2008 Delk
2008/0220933 A1 9/2008 Maeda
2008/0236912 A1 10/2008 Ueoka
2008/0243324 A1 10/2008 Harris
2008/0288132 A1 11/2008 King et al.
2009/0018716 A1 1/2009 Ambrosio
2009/0024267 A1 1/2009 Kawai

(56) References Cited

U.S. PATENT DOCUMENTS

2009/0030568 A1 1/2009 Amano
2009/0095549 A1 4/2009 Dalum
2009/0107744 A1 4/2009 Foersterling
2009/0177345 A1 7/2009 Severinsky
2009/0254241 A1 10/2009 Basir
2010/0255952 A1* 10/2010 Diehl et al. ....................... 477/5
2011/0202234 A1 8/2011 Bradley et al.
2013/0073129 A1 3/2013 Martin et al.

FOREIGN PATENT DOCUMENTS

DE 4204384 A1 8/1993
DE 19528629 A1 2/1997
EP 0492152 7/1992
EP 0645271 3/1995
EP 1068976 B1 1/2001
EP 1140533 1/2003
EP 1297982 A2 4/2003
EP 0784743 5/2003
EP 1759915 3/2009
FR 2699127 6/1994
FR 2910101 6/2008
JP 11-299004 10/1990
JP 03239631 A 10/1991
JP 07195955 8/1995
JP H07240213 9/1995
JP 10309003 A 11/1998
JP 11146502 5/1999
JP 200023301 A 1/2000
JP 2000-337238 12/2000
JP 2001105910 4/2001
JP 2001-190007 7/2001
JP 2002118903 4/2002
JP 2002247712 8/2002
JP 2004017890 1/2004
JP 2004092569 A 3/2004
JP 2004136743 5/2004
JP 2004236609 8/2004
JP 2004318370 11/2004
KR 20-1999-0000074 1/1999
KR 10-2004-0000730 1/2001
KR 20-0217389 3/2001
TW 493560 7/2002
TW 505338 10/2002
WO WO 0075532 A1 12/2000
WO WO 2004062957 A1 7/2004
WO WO 200503600 A1 1/2005
WO WO 2006038968 4/2006
WO WO 2006099427 A2 9/2006
WO WO 2007030069 A1 3/2007
WO WO 2007097819 A2 8/2007
WO WO 2009086135 A2 7/2009

OTHER PUBLICATIONS

Canadian Intellectual Property Office, Examination Report, Application No. 2,643,165, dated Oct. 24, 2012.
Decision on Rejection. Application No. 2008-556310, Apr. 24, 2012.
English language Abstract prepared by Japanese Patent Office, Publication No. 2002-247712, date of publication Aug. 30, 2002.
English language Abstract prepared by Japanese Patent Office, Publication No. 2001-105910, date of publication Apr. 17, 2001.
English Translation of Office Action for Taiwan Invention Patent Application No. 096105113 dated Jun. 29, 2011, 17 pages.
English Translation of Office Action for Taiwan Invention Patent Application No. 096105113, Apr. 2, 2012, 1 page.
English Translation, Japanese Patent Application Laid-Open No. 2004-17890 (P2044-17890A), Laid-Open date Jan. 22, 2004.
European Patent Office, European Examination Report; Application No. 09728436.8-2421; dated Sep. 1, 2011.
European Patent Office, European Report, Application No. EP 11164435; dated Jun. 20, 2011.
European Patent Office, European Search Report dated Nov. 23, 2009, Application No. 06850144.4- 2207/199439, 6 pages.
European Patent Office, European Search Report, Application No. EP11164435, Jun. 20, 2011, 7 pages.
European Patent Office, Examination Report, Application No. 08797526.4, dated Oct. 12, 2011.
European Patent Office, Office Action, Application No. 08797526.4 dated Apr. 19, 2013.
European Patent Office, Patent Abstracts of Japan, Publication No. 2004-136743.
European Patent Office, Search Report, Application No. 08797526.4, dated Sep. 30, 2011.
First Office Action, Japanese Patent Application No. 2008-556310 dated Apr. 5, 2011, 7 pages.
Hungarian Intellectual Property Office, Examination Report, Application No. 201006777-5, mailed Feb. 14, 2013.
Hungarian Intellectual Property Office, Search Report and Written Opinion, Application No. 201006777-5, dated May 25, 2012, 14 pages.
IB of WIPO, International Preliminary Report on Patentability, International Application No. PCT/US2009/036904, dated Sep. 21, 2010.
Intellectual Property Office of Singapore, Search and Examination Report, Singapore Patent Application No. 201007209-8, Aug. 1, 2012.
International Bureau of WIPO; International Preliminary Report on Patentability, PCT/US2010/047819, Mar. 15, 2012, 7 pages.
International Searching Authority, International Preliminary Report on Patentability and Written Opinion of the; International Application No. PCT/US2010/028978, dated Sep. 13, 2011, 13 pages.
International Searching Authority, International Preliminary Report on Patentability dated Mar. 9, 2009, Application No. PCT/US06/60833, 12 pages.
International Searching Authority, International Search Report and Written Opinion, Application No. PCT/ US06/60833, Mar. 20, 2008, 9 pages.
International Searching Authority, International Search Report and Written Opinion, Application No. PCT/US2009/038938, Jun. 12, 2009, 12 pages.
International Searching Authority, International Search Report and Written Opinion, Application No. PCT/US2009/036904, May 14, 2009, 14 pages.
International Searching Authority, International Search Report and Written Opinion, Application No. PCT/US2008/072672, Nov. 5, 2008, 6 pages.
International Searching Authority, International Search Report and Written Opinion, PCT/US2010/047819, Oct. 28, 2010, 8 pages.
International Searching Authority, International Search Report and Written Opinion, Application No. PCT/US2010/028978, Dec. 15, 2010.
IP Australia; Patent Examination Report No. 1, Patent Application No. 2008352923, Mar. 15, 2013.
Japanese Patent Office, Notice of Reasons for Rejection, Japanese Patent Application No. 2011-500758, dated Oct. 23, 2012.
Japanese Patent Office, Second Office Action, Japanese Patent Application No. 2011-500758 dated Jul. 30, 2013.
Korean Intellectual Property Office, Notice to File a Response, Preliminary Rejection, Patent Application No. 10-2010-7023374 dated Jan. 11, 2011.
Korean Intellectual Property Office, Notice to File a Response, Preliminary Rejection, Patent Application No. 10-2010-7023374 dated Jul. 11, 2011.
Korean Intellectual Property Office, Notice to File a Response, Patent Application No. 10-2008-7022954, Sep. 7, 2012.
Korean Intellectual Property Office, Notice to File a Response, Patent Application No. 10-2011-7026244, Sep. 16, 2013.
Memo Concerning the Official Action Reported in the Covering Letter; Mexican Patent Application No. MX/a/2010/010249, 4 pages.
Mexican Patent Office, Memo Concerning the Official Action Reported in the Covering Letter; Mexican Patent Application No. MX/a/2010/010249, 8 pages, dated Apr. 10, 2012.

(56) References Cited

OTHER PUBLICATIONS

Mexican Patent Office, Memo Concerning The Official Action Reported in the Covering Letter: Mexican Patent Application No. MX/a/2010/010249, 5 pages, dated Nov. 27, 2012.
Non-Final Office Action, Japanese Application No. 2011-220007, mailed Dec. 21, 2012.
Palumbo Anthony J., et al, "Ultracapacitor Based Hybrid Booster Drive," 20th International Electric Vehicle Symposium and Exposition (EVS 20): Powering Sustainable Transportation, Aug. 2003, revised Jun. 2004, 16 pages.
Patent Cooperation Treaty, Corrected International Preliminary Report on Patentability, Application No. PCT/US06/60833, Mar. 20, 2009. 6 pages.
Patent Cooperation Treaty, Corrected International Preliminary Report on Patentability, International Application No. PCT/US2008/072672, Aug. 11, 2010.
Search and Examination Report, Singapore Patent Application No. 200805771-3, Oct. 29, 2010, 12 pages.
Southwest Research Institute, "Fuel cell-assisted truck completes cross-country trek," http://www.swri.org/9what/releases/2005/fuelcell.htm, May 26, 2005, SwRI, San Antonio, TX.
The State Intellectual Property Office of the People's Republic of China, Notice on the First Office Action, China Patent Application No. 200680053009.2, Nov. 3, 2010, 4 pages.
The State Intellectual Property Office of the People's Republic of China, Notice on the First Office Action, Application No. 200980110599.1, dated May 21, 2012.
The State Intellectual Property Office of the People's Republic of China, Notice on the First Office Action, Application No. 200880128284.5, Jan. 29, 2013.
The State Intellectual Property Office of The People's Republic of China, Notice on the Second Office Action, Application No. 200980110599.1, Mar. 8, 2013.
The State Intellectual Property Office of The People's Republic of China, Notice on the Second Office Action, China Patent Application No. 200680053009.2, Dec. 13, 2011, 5 pages.
Translation of EP 0 492 152 A1, European Patent Application No. 91120122.6, filing date Nov. 26, 1991.
Translation, Report of the First Office Action, Application No. 200880128284.5 mailed Aug. 1, 2013.
U.S. Army Public Affairs Office, "TARDEC Sponsors Cross-Country Fuel Cell Truck Expedition." RDECOM Magazine, Jul. 2005, p. 6, Aberdeen Proving Ground, MD.
United States Patent & Trademark Office, Final Office Action, U.S. Appl. No. 12/402,199, Aug. 1, 2012.
United States Patent & Trademark Office, Final Office Action, U.S. Appl. No. 12/748,332, Apr. 4, 2013.
United States Patent & Trademark Office, Final Office Action, U.S. Appl. No. 12/874,838, Jun. 20, 2013.
United States Patent & Trademark Office, Non-Final Office Action, U.S. Appl. No. 12/402,199, Jul. 8, 2013.
United States Patent & Trademark Office, Non-Final Office Action, U.S. Appl. No. 12/933,415, Apr. 25, 2013.
United States Patent & Trademark Office, Non-Final Office Action, U.S. Appl. No. 12/933,415, Mar. 19, 2013.
United States Patent & Trademark Office, Non-Final Office Action, U.S. Appl. No. 12/748,332, May 29, 2012.
United States Patent & Trademark Office, Non-Final Rejection, U.S. Appl. No. 12/874,838, dated Dec. 5, 2012.
United States Patent & Trademark Office, Non-Final Rejection, U.S. Appl. No. 12/721,537, Jan. 17, 2013.
United States Patent & Trademark Office, Office Action Summary, U.S. Appl. No. 12/933,415, Jul. 3, 2012.
United States Patent and Trademark Office, Office Action, U.S. Appl. No. 12/469,493, dated Jun. 10, 2011.
Korean Intellectual Property Office, Notice to File a Response, Patent Application No. 10-2011-7026244, dated Sep. 16, 2013.
Second Office Action, Notice of Reasons for Rejection, Japanese Application No. 2011-220007 dated Sep. 10, 2013.
European Patent Office, Office Action, Application No. 10719542.2, dated Jul. 24, 2013.
The State Intellectual Property Office of the People's Republic of China, Translation of Notice on the First Office Action, China Patent Application No. 201080011862.4, Oct. 28, 2013, 2 pages.
Australian Government IP Australia, Patent Application No. 2009225808, Patent Examination Report No. 1, date of issue, Sep. 11, 2013.
Mexican Patent Office, Memo Concerning the Official Action Reported in the Covering Letter; Mexican Patent Application No. MX/a/2010/010249, 6 pages, dated Nov. 4, 2013.
The State Intellectual Property Office of the People's Republic of China, Notice on the Third Office Action, China Patent Application No. 200980110599.1, Oct. 23, 2013.
United States Patent and Trademark Office, Final Office Action, U.S. Appl. No. 12/874,838, dated Feb. 26, 2014.
Japanese Translation of Japanese Patent Laid-Open Application No. 10-309003 (43) Laid-Open date Nov. 17, 1998, 65 pages.
Canadian Intellectual Property Office, Office Action, Application No. 2,715,021, Jun. 2, 2014.
Canadian Intellectual Property Office, Office Action, Application No. 2,717,040, May 21, 2013.
Intellectual Property Corporation of Malaysia, Substantive Examination Adverse Report (Section 30(1) / 30(2)), Application No. PI 210004331, Apr. 30, 2014.
Korean Intellectual Property Office, Notice of Final Rejection, Patent Application No. 10-2011-7026244, dated Jun. 26, 2014.
Korean Intellectual Property Office, Notice to File a Response, Patent Application No. 10-2014-7029550, Nov. 28, 2014.
The State Intellectual Property Office of the People's Republic of China, Notice on the Second Office Action, Patent Application No. 201080011862.4, May 16, 2014.
The State Intellectual Property Office of the People's Republic of China, Notice on the Fourth Office Action, Patent Application No. 200680053009.2, Feb. 27, 2015.
The State Intellectual Property Office of the People's Republic of China, Notice on the Third Office Action, Patent Application No. 200680053009.2, Aug. 19, 2014.
The State Intellectual Property Office of the People's Republic of China, Notice on the Third Office Action, Patent Application No. 201080011862.4, Oct. 11, 2014.
The State Intellectual Property Office of the People's Republic of China, Notice on the Third Office Action, Patent Application No. 200880128284.5, Jul. 2, 2014.
The State Intellectual Property Office of the People's Republic of China, Decision on Rejection, Patent Application No. 200980110599.1, May 6, 2014.
United States Patent & Trademark Office, Final Office Action, U.S. Appl. No. 12/748,332, dated Apr. 22, 2014.
United States Patent & Trademark Office, Issue Notification, U.S. Appl. No. 12/060,368, U.S. Pat. No. 7,921,945, issue date Apr. 12, 2011.
United States Patent & Trademark Office, Issue Notification, U.S. Appl. No. 11/558,786, U.S. Pat. No. 7,600,595, issue date Oct. 13, 2009.
United States Patent & Trademark Office, Issue Notification, U.S. Appl. No. 12/577,041, U.S. Pat. No. 7,921,950, issue date Apr. 12, 2011.
United States Patent & Trademark Office, Issue Notification, U.S. Appl. No. 11/374,709, U.S. Pat. No. 7,543,454, issue date Jun. 9, 2009.
United States Patent & Trademark Office, Issue Notification, U.S. Appl. No. 12/469,493, U.S. Pat. No. 8,286,440, issue date Oct. 16, 2012.
United States Patent & Trademark Office, Issue Notification, U.S. Appl. No. 12/933,415, U.S. Pat. No. 8,668,035, issue date Mar. 11, 2014.
United States Patent & Trademark Office, Issue Notification, U.S. Appl. No. 12/721,537, U.S. Pat. No. 8,565,969, issue date Oct. 22, 2013.

* cited by examiner

RETROFITTING A VEHICLE DRIVE TRAIN

CROSS-REFERENCES TO RELATED APPLICATIONS

This application is a divisional of U.S. patent application Ser. no. 12/721,537, issued as U.S. Pat. No. 8,565,969 on Oct. 22, 2013, which claims benefit of priority dates of U.S. patent application Ser. No. 12/060,368, filed Apr. 1, 2008; PCT patent application no. PCT/US2008/072672, filed Aug. 8, 2008; U.S. provisional patent application Ser. No. 61/224, 611, filed Jul. 10, 2009; and U.S. provisional patent application Ser. No. 61/242,370, filed Sep. 14, 2009, This application also hereby incorporates by reference herein U.S. patent application Ser. No. 11/374,709, filed Mar. 14, 2006; U.S. provisional patent application Ser. No. 60/909,748, filed Apr. 3, 2007; and U.S. patent application Ser. No. 11/558,786, filed Nov. 10, 2006.

DETAILED DESCRIPTION

Figure 1:
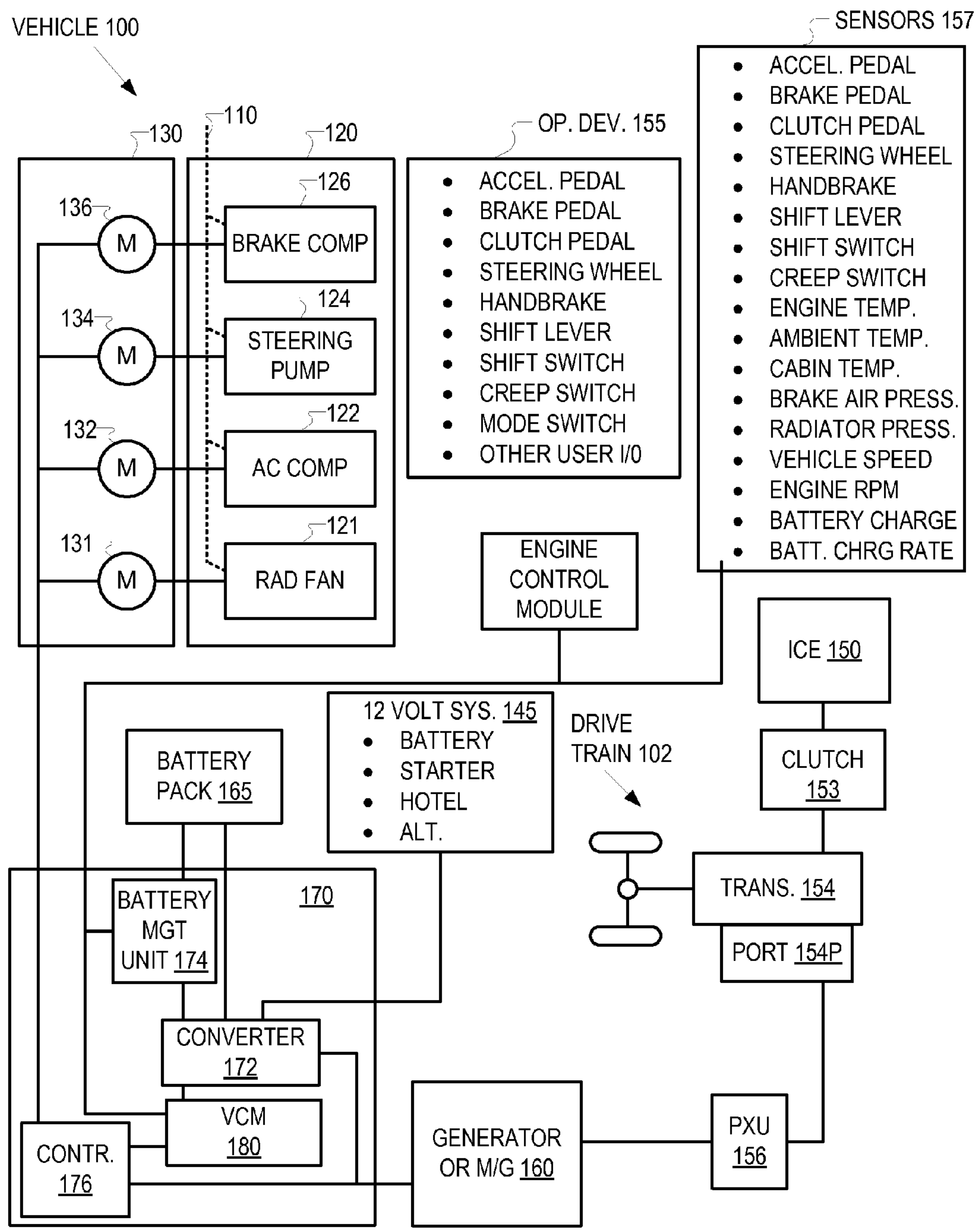
FIG. 1 illustrates a block diagram of a vehicle retrofitted to provide anti-idling and/or cabin comfort features, according to embodiments of the invention.

Referring now to FIG. 1, in a vehicle 100, original driver arrangements 110 for auxiliary devices 120 may be replaced with electrical drivers 130. (Auxiliary devices 120 may also be referred to as "parasite" or "parasitic" loads.) This may include installing electric drivers 130 for auxiliary devices 120, which include a radiator fan 121, an air-conditioning coolant compressor 122, a power steering pump 124, and an air compressor 126 for brakes, according to embodiments of the present invention. In an alternative, this may also include other auxiliary devices, including a fuel pump and an engine coolant pump (not shown). Typical original driver arrangements 110 for these auxiliary devices 120 may include belt drives that couple fan 121, air-conditioning coolant compressor 122, and power steering pump 124 to a crankshaft of internal combustion engine ("ICE") 150, and a Bendix gear that couples air compressor 126 to engine 150.

Herein, the term "auxiliary system" refers to a system on the vehicle other than the internal combustion engine and the drive train. For example, auxiliary systems include systems for braking, steering, engine cooling, engine or drive train lubrication, heating, ventilating, cooling, lighting, sounding a horn, data acquisition, global positioning, etc. The "vehicle" may be or include a trailer. As the term is used herein, an "auxiliary device" is an apparatus that enables operation of an auxiliary system, which may include, for example, controlling, supplying feed for, or otherwise driving, an auxiliary system process, providing power of power conversion for an auxiliary system, providing data, providing user input and/or output, etc.

Electric generator 160 may he added to maintain an added battery 165 electrically charged and to supply additional electrical drivers 130 and the existing lower voltage DC system 145. (It should be understood that while device 160 is referred to herein in various ways, it may be a motor, generator, or motor/generator ("SM/G"), regardless of whether referred to herein as one or the other.) In embodiments of the invention, original equipment manufacturer ("OEM") alternator in 12 volt DC ("VDC") system 145 may be removed. In such embodiments, a combination of generator 160 and battery 165 has sufficient capacity to supply electrical drivers 130 and system 145, including its starter.

Added battery 165 may be connected to a control device 170, where device 170 is added to vehicle 100 and connected to generator 160 to supply and control drivers 130 and to convert the voltage of battery 165 to a lower voltage for supplying OEM low voltage DC system 145, which may include a battery and starter. Control device 170 and battery 165 may be configured to supply electric drivers 130 for auxiliary devices 120, as well as the OEM low voltage DC system 145, in embodiments of the invention, battery 165 is a 12.9 KWH, 200 to 450 volt DC, lithium-ion battery, and electric drivers 130 are 240 volt, 3 phase AC, ranging in size from 3 to 6 HP.

More specifically, control device 170 may include a converter 172 (also referred to as a "battery charger") for converting AC voltage produced by engine 150 driven generator 160 to charge battery 165 and to charge the low voltage system 145 battery at its lower operative voltage and operate low voltage system 145 starter. In some embodiments and operating circumstances, converter 172 may convert the voltage supplied by battery 165 in order to supply system 145 and operate motor generator 160 as a starter motor, as a traction motor, or to propel, vehicle 100 via power exchange unit ("PXU") 156, which may be coupled to transmission 154 via power takeoff ("PTO") port 154P.

In some operating circumstances, converter 172 may convert voltage supplied by battery 165 to energize controller/driver 176. Generator 160 may also energize motor controller/driver 176, which energizes and controls electric drivers 130. Controller/driver 176 may provide variable frequency drives and control, according to embodiments.

In embodiments of the invention, OEM vehicle low voltage DC system 145 starters may be retained, as described above. In other embodiments of the invention, the starter may be replaced with a new starter, in yet other embodiments of the invention, the added generator 160 may be a motor generator and may have sufficient starting torque such that motor generator 160 may be arranged in a configuration to start the vehicle's engine 150, instead of starting engine ISO via an OEM vehicle starter of system 145. In these embodiments, the OEM vehicle starter in system 145 may be removed.

Since OEM air compressor 126 is driven by an electric driver 136, rather than by an OEM Bendix gear (part of OEM drive arrangement 110), OEM air compressor 126 may be relocated, and added generator 160 may be mounted in the location where OEM air compressor 126 was previously installed. In an arrangement, OEM air compressor 126 may he relocated to a rack under the rails of the frame of vehicle 100 or to a location behind the cab.

Added generator (or motor/generator) 160 may be driven by internal combustion engine 150. Specifically, in embodiments, generator or motor generator 160 may be coupled to engine 150 via transmission 154, such as via a PXU 156 through power takeoff port 154P of transmission 154. In embodiments of the invention, transmission 154 may be a manual transmission. In embodiments, vehicle 100 has no automatic transmission.

According to described arrangements herein, engine 150 charges battery 165 via generator 160, wherein the combination of charged battery 165, control device 170, and drivers 130 enable maintaining vehicle 100 safety and comfort, e.g., operation of brakes, steering, and air-conditioning, even during intervals when, control device 170 shuts down, engine 150, winch, may include rest stops, delivery stops, stops in staging areas, and traffic stops, such as at traffic stops for traffic lights or in traffic jams. This facilitates compliance with anti-idling restrictions and is in contrast to well-known arrangements in which auxiliary power units are used to supply power to auxiliary devices for anti-idling stops and auxiliary air-conditioners are used for cabin comfort.

In some embodiments described herein and in one or more of the above referenced patent applications, an electric traction motor generator is provided that is coupled to the engine via a power exchange unit through a power takeoff port on a manual transmission. These embodiments and others include a generator or motor generator 160 driven by engine 150 for recharging battery 165. In some applications of some embodiments the vehicle does not necessarily operate for extended intervals in an only-electric-traction mode, such as for long hauls at high speeds, for example. Also, in some embodiments of the present invention, device 160 is a generator and not a motor, such that in those embodiments vehicle 100 does not have an electric traction motor and, correspondingly, has no electrical propulsion mode of operation (i.e., no "electric traction" mode). Also, in some embodiments, device 160 is coupled to engine 150 without interposing clutch 153. In spite of these and other variations, unexpected advantages of embodiments of the present invention have been discovered.

That is, the retrofitting of a vehicle 100 as described herein, including an addition of electric drivers 130, generator or motor generator 160, battery 165, and controller/converter 170, may provide economical and efficient ICE 150 shut off in lieu of idling and cabin air conditioning during ICE 150 shut off, which may include air conditioning even for extended rest stops. As previously disclosed, this arrangement is in contrast to the well-known use of auxiliary power units and auxiliary air-conditioners. By design and testing, it has been discovered that the retrofitting of a vehicle 100 as described herein improves auxiliary device efficiency, which results in corresponding fuel savings, and that the functionality of the retrofit arrangement exceeds conventional expectations. Indeed, contrary to conventional wisdom, the efficiency improvement is of such an amount as to realize a return on the investment for retrofitting the vehicle 100 within a reasonable time period, even for embodiments of the invention wherein battery 165 is large enough to enable extended air-conditioned rest stops for long-haul vehicles.

For a vehicle 100 as described herein, most especially in embodiments in which generator 160 is coupled to drive train 102 via transmission 154 through power take off port 154P, but also in other embodiments to some extent, regenerative braking features may apply that were disclosed in the earlier cross-referenced and incorporated patent applications. These may include control of regenerative braking responsive to an accelerator pedal and a shift lever button, which may be among operator actuated devices ("Op. Dev.") 155.

In FIG. 1, other optional operator actuated devices 155 are shown, as well, including a handbrake, brake pedal, clutch pedal, shift lever, and a creep switch. FIG. 1 also shows optional sensors 157, including sensors that detect actuation of some of operator actuated devices 155, namely the steering wheel, handbrake, brake pedal, clutch pedal, shift lever, shift lever button, creep switch, and sensors that indicate position of others, including the accelerator pedal and steering wheel. For the accelerator pedal, one or more sensors 157 may provide one or more signals proportional to pedal position and rate of movement, in various embodiments of the invention. For the steering wheel, one or more sensors 157 may provide one or more signals indicating position limits, movement, direction of movement, and rate of movement, in various embodiments of the invention. Sensors 15 may also include engine temperature, ambient air temperature, air brake pressure, and battery 165 state of charge.

Other hybrid vehicles trigger regenerative braking responsive to the brake pedal being depressed. One or more of the above referenced and incorporated U.S. patent applications disclose switching between an electric traction mode and an ICE mode, in an over-the-road context described herein, a focus is the ICE mode of operation with at least some electrified parasite loads, anti-idling features, and cabin comfort features for rest stops. However, aspects of the same control arrangement regarding regenerative braking responsive to the accelerator pedal generally apply in the present context in similar fashion as described in the one or more referenced and incorporated U.S. patent applications.

It should be appreciated, of course, that regenerative braking has an impact on economic feasibility and hence usefulness, since it allows energy to be recaptured that would otherwise be wasted. Regenerative braking tends to enable the use of a smaller, cheaper, more lightweight battery 165 for a given vehicle duty cycle. The above explanation should not be taken to imply that the arrangements described herein cannot all be adapted to enable some regenerative braking. However, it may be understood from the above that some arrangements described herein tend to intuitively seem impractical, because motor generator 160 is not operated and is not coupled to the drive train in a manner that greatly facilitates extended intervals of more neatly optimal regenerative braking, e.g., regenerative braking with generator 160 decoupled from ICE 150.

In another arrangement, instead of installing generator 160 at a different location, OEM alternator 142 is replaced with a larger alternator. However, in such a configuration, there may not be enough space in the engine 150 compartment, at the location of the OEM alternator, and frictional losses through the belt driver arrangement 110 for OEM alternator 142 may be an issue. In another arrangement, the OEM starter of system 145 is replaced with a motor generator. However, an OEM gear that couples the starter of system 145 to engine 150 may not be rated for continuous duty.

Figure 2:
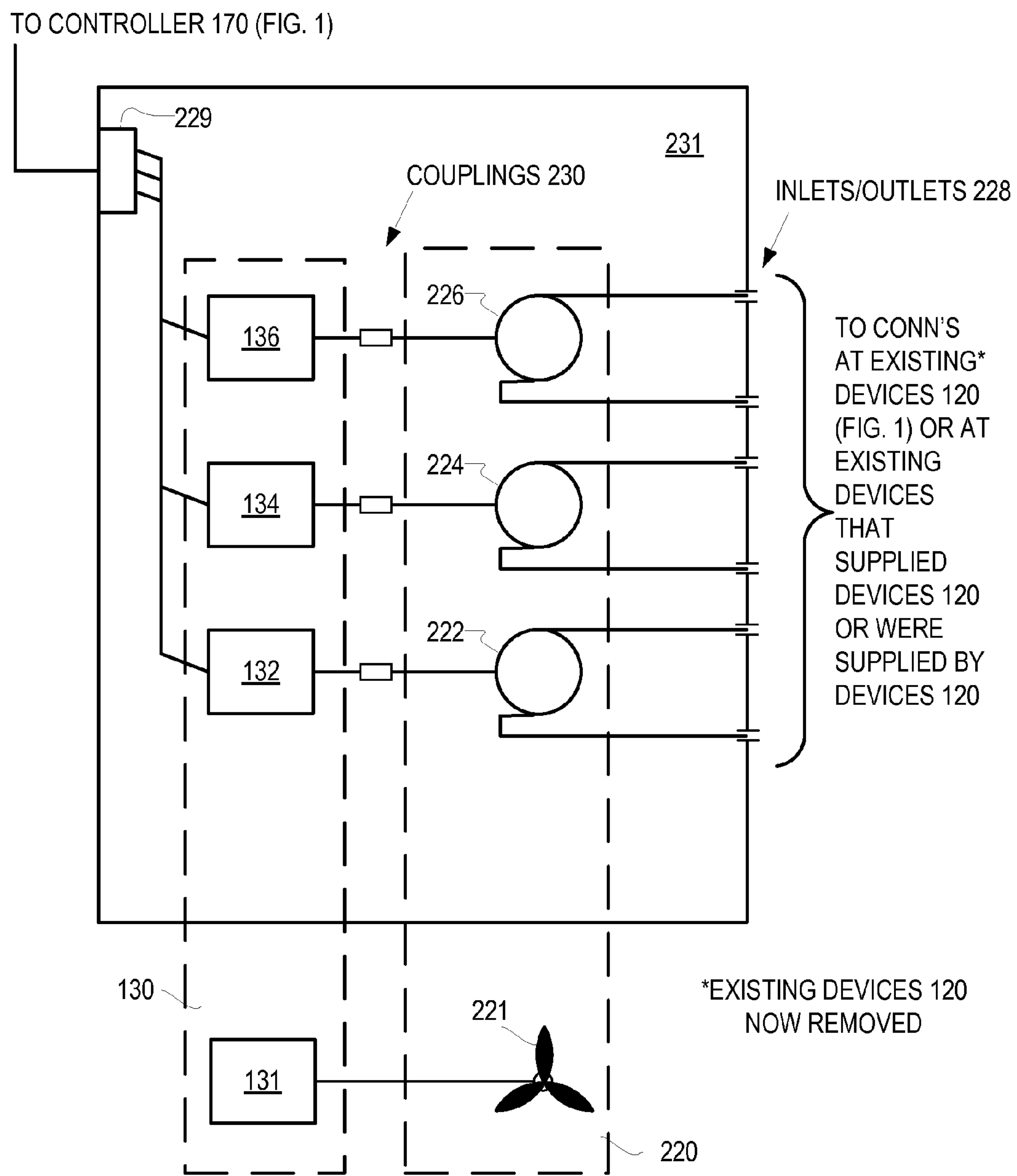
FIG. 2 illustrates an arrangement of components that facilitates retrofitting a vehicle, according to embodiments of the invention.

Referring now to FIG. 2 along with FIG. 1, in embodiments of the invention, not only are drive arrangements 110 for auxiliary devices 120 replaced by electric drivers 130, but OEM devices 120, i.e., fan 121, air-conditioning coolant compressor 122, power steering pump 124, and air compressor 126 for brakes, for example, may be replaced with higher efficiency driven devices 220, e.g., fan 221, air-conditioning coolant compressor 222, power steering pump 224, and air compressor 226 for brakes. Furthermore, in embodiments of the invention, some of electric drivers 130 and driven devices 220 may be provided in a preassembled arrangement prior to being retrofitted to vehicle 100, i.e., mounted in container/box 231 with mechanical couplings 230 of respective drivers 130 and respective driven devices 220 pre-coupled. In this manner, retrofitting vehicle 100 may include removing drive arrangements 110 and driven devices 120 and mounting container 231, which has electric drivers 130 and driven, devices 220 pre-mounted therein.

As disclosed herein, in one or more embodiments of the present invention, one or more of original fan 121, compressor 122, pump 124, and compressor 126 may be replaced by corresponding one or more of tan 221, compressor 222, pump 224, and compressor 226. Consequently, depictions and references throughout, the present, patent application herein to loads 120, fan 121, compressor 122, pump 124, and compressor 126 may also apply to loads 220, fan 221, compressor 222, pump 224, and compressor 226.

In embodiments, devices 220 may be pre-piped to inlets/outlets 228 formed in container 231 and drivers 130 may be electrically pre-connected to one or more terminal strips 229 mounted on container 231, Then, once container 231 is mounted, mechanical piping is installed from inlets/outlets 228 to existing inlets/outlets for OEM devices 120 (either at fluid, coolant, and air connecting points at devices 120, or at connecting points at existing devices that originally supplied fluid, coolant, and air to devices 120, or at existing devices that originally received fluid, coolant, and air from devices 120) and electrical connections may be made from terminal strip(s) 229 to control device 170. (Herein, the term "pipe" or "piping" includes pipe and tubing, both flexible and rigid.) In this manner, drivers 130 and driven devices 220 may be more quickly and efficiently added to vehicle 100 in a retrofitting operation.

Figure 3:
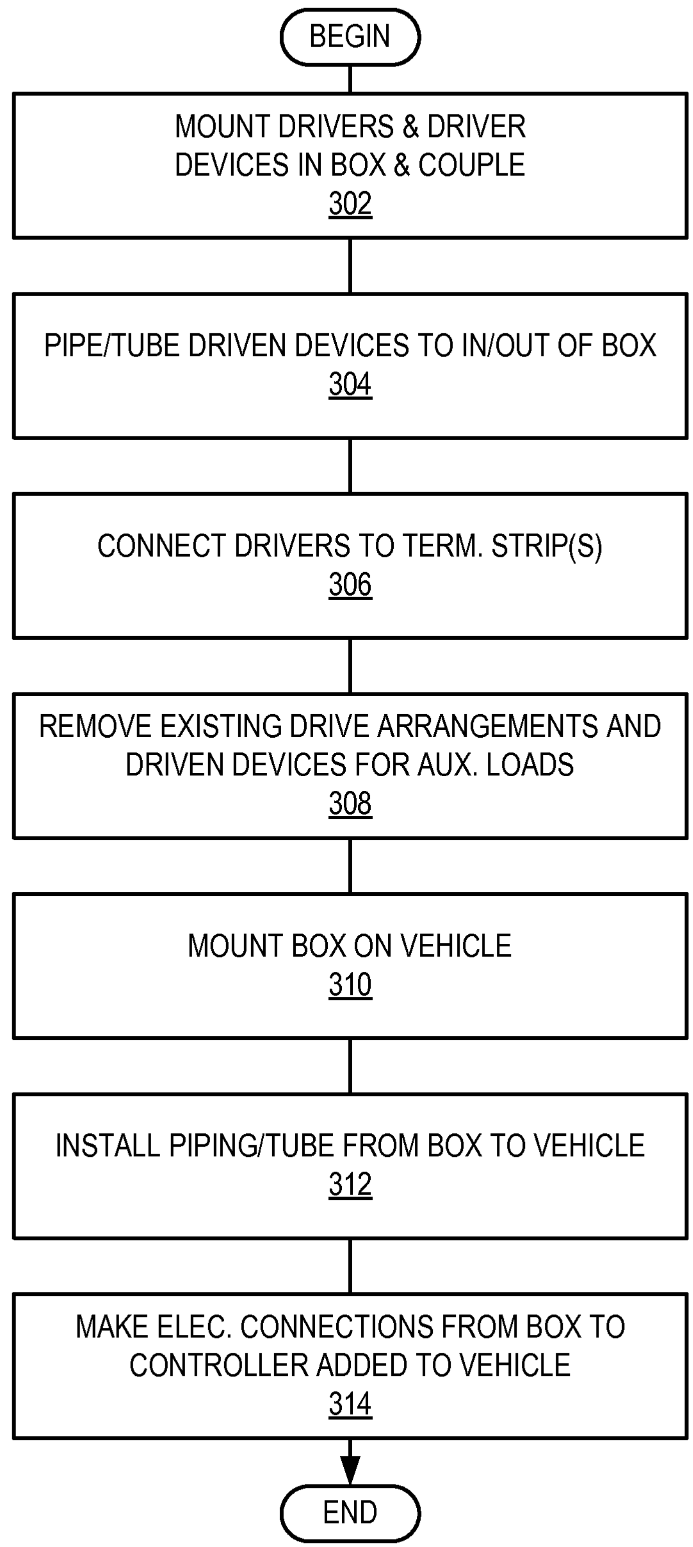
FIG. 3 illustrates certain aspects of retrofitting a vehicle that utilizes the arrangement of FIG. 2, according to embodiments of the invention.

Referring now to FIG. 3, a flow chart is shown for a method of retrofitting a vehicle. (The actions shown do not necessarily have to be performed in the sequence indicated.) Electric, drivers and driven devices may be mounted 302 in a container with mechanical couplings of respective drivers, and respective driven devices pre-coupled to the drivers and driven devices prior to retrofitting electric drivers and driven devices to the vehicle. Driven devices in the container may be piped 304 to inlets and outlets in the container before retrofitting electric drivers and driven devices to the vehicle. Drivers in the container may be electrically connected 306 to one or more terminal strips mounted on the container before retrofitting electric drivers and driven devices to the vehicle.

Drive arrangements and driven devices pre-existing on the vehicle may be removed 308. The container is mounted 310 on the vehicle. Piping may be installed 312 from inlets/outlets to existing inlets/outlets for OEM devices (either at fluid, coolant, and air connecting points at devices, or at connecting points at existing devices that originally supplied fluid, coolant, and air to original devices, or at existing devices that originally received fluid, coolant and air front original devices). Electrical connections may be made 314 from terminal strip(s) to a controller added to the vehicle.

As described above, retrofit drivers and driven devices may be more quickly and efficiently added to the vehicle in a retrofitting operation, and existing drive arrangements for auxiliary devices of the vehicle may be replaced with electric drivers in the container. Likewise, pre-existing driven devices for the auxiliary devices may be replaced with driven devices in the container, which may be adapted for the electrical drivers. Replacing the drive arrangements for auxiliary devices with electric drivers may include replacing drive arrangements for air-conditioning, power steering, and air brake auxiliary devices. Replacing driven devices for the auxiliary devices may include replacing as air-conditioning coolant compressor, a power steering pump, and an air compressor for brakes. The replacing of driven devices may include replacing driven devices with higher efficiency driven devices.

In one or more embodiments, electrical components may not be integrated or installed on the vehicle in the usual positions. Instead, they may be housed in a single container, which may include batteries 165 (FIG. 1) and/or controller/ converter 170 (FIG. 1), Thus, most, if not all, of the entire retrofit system may be easily removed, such as in the event of repossession.

Figure 5A:
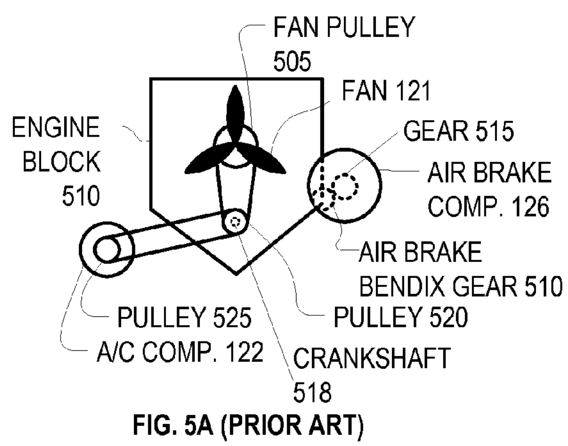
FIG. 5A illustrates an arrangement of an internal, combustion engine block and auxiliary devices.

Referring now to FIG. 5A, engine block 510 is shown for ICE 150 of FIG. 1 with a pulley 505 for radiator fan 121 and a pulley 525 for air-conditioning compressor 122. A crankshaft 518 of engine block 510 has one or more pulleys 520 driving parasite loads via their respective pulleys, such as pulley 505 for radiator fan 121 and pulley 525 for air-conditioning compressor 122. A Bendix gear 510 coupled to crankshaft 518 engages a gear 515 of air brake compressor 126.

Figure 5C:
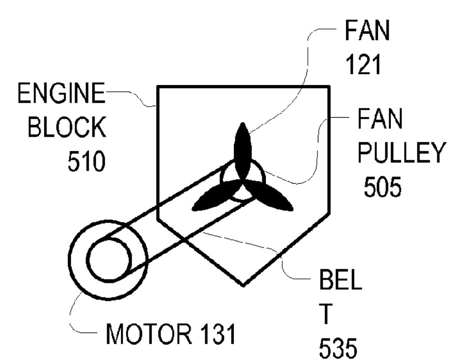
FIG. 5C illustrates an arrangement of an internal combustion engine block and auxiliary devices, according to embodiments of the invention.
Figure 5B:
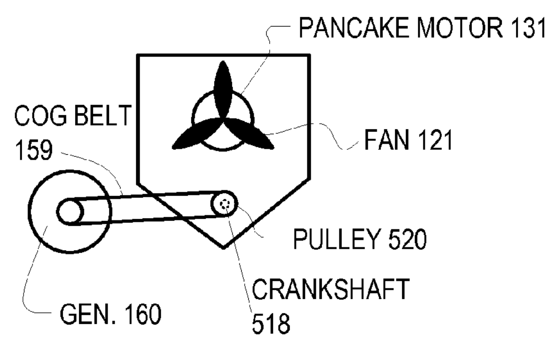
FIG. 5B illustrates an arrangement of an internal combustion, engine block, and auxiliary devices, according to embodiments of the invention.
Figure 5D:
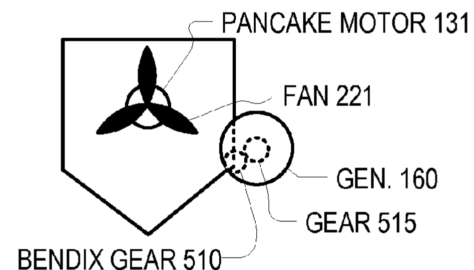
FIG. 5D illustrates an arrangement of an internal combustion engine block and auxiliary devices, according to embodiments of the invention.

In FIG. 5B, a pancake motor 131 may be added to drive radiator fan 121 and may be located between fan 121 and the internal combustion engine block 510, according to embodiments of the present invention. Alternatively, radiator fan 121 is driven by a motor 131 via a belt 535 drive, in which case fan motor driver 131 may be located in the space where the OEM air-conditioning compressor 122 (FIG. 1) was located in FIG. 5C. In an embodiment, as shown in FIG. 5D, generator 360 is coupled to Bendix gear 510, by which ICE 150 conventionally drove air brake compressor 126, in which case generator 160 may be located near where OEM air brake compressor 126 (FIG. 1) was located.

Alternatively, in FIG. 5B, generator 160 may be driven by a cog belt 530 connected to one of the pulleys 520 of internal combustion engine crankshaft 518, in which ease generator 160 may be located where air-conditioning compressor 122 was previously located. As described in cross-referenced and incorporated U.S. patent application Ser. No. 11/558,786, tiled Nov. 10, 2006, PCT patent application No. PCT/US08/72672, filed Aug. 8, 2008, U.S. provisional patent application Ser. No. 61/224,611, filed Jul. 10, 2009, and U.S. provisional patent application Ser. No. 61/242,370, filed Sep. 14, 2009, noted previously, generator 160 may be coupled to the drive train via a PXU 156 (FIG. 1) through a power take off port 154P (FIG. 1) of manual transmission 154 (FIG. 1) input. This transmission-coupled arrangement has advantages in that it implements a mode of operation in which there is more substantial recharging of battery 165 via generator 160 operating as a regenerative braking load, i.e., a mode wherein clutch. 153 (FIG. 1) disengages generator 160 from ICE 150 (FIG. 1), so that ICE 150 is not involved in braking.

For a vehicle with electric drivers for parasite loads, it may be very important to have optimal battery charging capability, which may include regenerative braking, in one or more embodiments of the invention.

Such arrangement(s) provide fuel savings due to increased, efficiency of parasite loads. This is because, in embodiments, the drivers may be all "on demand," wherein they may be turned off when there is no demand for the feed they supply, or when there is no demand and it is expected they may be not needed soon. This is in contrast to the arrangement of at least some of the original equipment drivers. For example, in ah OEM arrangement for a power steering pump and an air brake compressor, the pomp and the compressor may be driven regardless of whether there is a demand for increased steering fluid pressure or brake air pressure. In embodiments of the present invention, mechanical drive arrangement 110 may be replaced by electric motors 134 and 136 for power steering pump 124 and air brake compressor 126. Electric motors 134 and 136 may be controlled by controller 176, which turns them on and off according to demand, as indicated by one or more sensors 157, e.g., pressure sensor for air brake compressor 126, and/or steering wheel limit or position or motion sensor for power steering pump 124.

The driven devices in embodiments of the present invention may also be more efficient due to variable speed control This is also in contrast to the arrangement of original equipment parasite loads that are driven by the ICE, since the speed of the ICE is determined by operating requirements other than speed requirements of the parasite load drivers. Consequently, the driven devices for ICE-driven parasite loads must provide adequate supply regardless of the speed at which the ICE happens to operate. This tends to lead to driven devices that are sized to provide adequate supply at ICE idle speed, e.g., around 500 RPM. Thus, at higher speeds, the driven devices tend to be oversized. For example, fan 121 and driver 131 must be of a size to provide sufficient air How to cool engine 150 under worst-ease conditions, e.g., the vehicle is idling at around 400-500 RPM and stationary on a hot day. Since an original equipment fan driver is not variable speed controlled, this ordinarily results in excess air flow under less demanding conditions, such as when conditions are cooler, e.g., the ICE is at higher speed and the vehicle is not stationary so that air is forced through the radiator not only by the radiator fan, but also by the motion of the vehicle.

In embodiments of the present invention as shown in FIGS. 1 and 2, particular efficiency improvements may be provided by replacing original radiator fan driver arrangement 110 with electric driver 131 and new fan 221. According to embodiments of the present invention, controller 176 may be configured to control driver 131 at multiple speeds, which may include providing a variable frequency output In this way, control device 170, including controller 176 and VCM 180, may control air flow according to demand by varying the speed of radiator fan motor 131. In embodiments, this is done by VCM 180 signaling controller 176 responsive to an ICE 150 temperature signal received by VCM 180 from a temperature sensor 157, which may be in ICE 150 engine block, or may be external to ICE 150 engine block, such as in a water or vapor line, which may be between the engine 150 block and radiator. In this way, lower air flow may be provided when less cooling is needed, which results in reduced energy consumption by the Ian driver while still providing sufficient air flow to accomplish adequate engine cooling.

Further, the speed range of electric driver 131 and fen blades of new fan 221 may be configured differently to provide a still further range of air flow turndown and energy savings. Original fen blade pitch is steep and the blade contour is extremely cupped in order to provide sufficient air flow to cool engine 150 with fen 121 running at around 400-500 RPM and vehicle 100 stationary on a hot day. Consequently, the original fan consumes as much as 30 HP with vehicle 100 stationary. In embodiments of the present invention, the fan blades of the new fan may be configured with less steep pitch and a flat, or more nearly flat, contour. For example, embodiments of the invention may include a Multi-Wing Optimizer 32/7-7/25°/PAG/5ZL/P-1 3/4/BR fan assembly, which has a 25 degree blade pitch, 7 blades, and 32 inch impeller diameter. Further, electric driver 131 of new fan 221 may be configured to operate continuously at a higher speed than the speed ICE 150 drives original fan 121. For example, electric driver 131 may operate fan 221 at speeds up to at least 1600 RPM, and in some instances 2200 RPM. Testing has confirmed that with this configuration, driver 131 may be as small as 3 HP and still provide adequate air flow for embodiments and applications of the present invention.

FIGS. 4A-40 herein below describe certain aspects of retrofitting a vehicle, such as vehicle 100, whereas FIGS. 6A-6G describe certain aspects of operating a retrofitted vehicle. It should be understood that variations in. retrofitting configuration described in FIGS. 4A-4G may be implemented as variations In vehicle operations and, conversely, variations in vehicle operation described in FIGS. 6A-6G may be implemented as variations in retrofitting configuration.

Figure 4A:
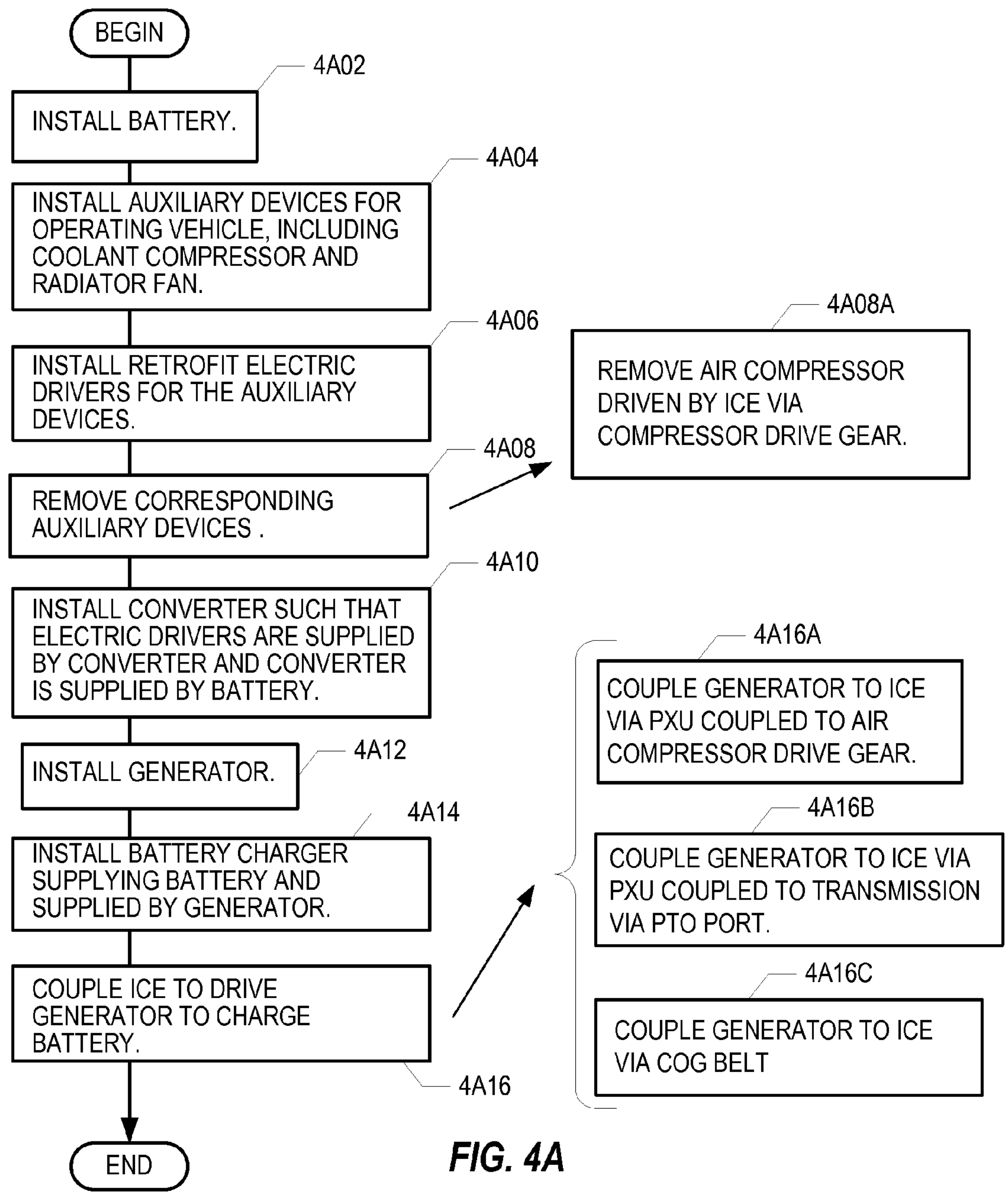
FIG. 4A illustrates general aspects of retrofitting a vehicle, according to embodiments of the invention.
Figure 4B:
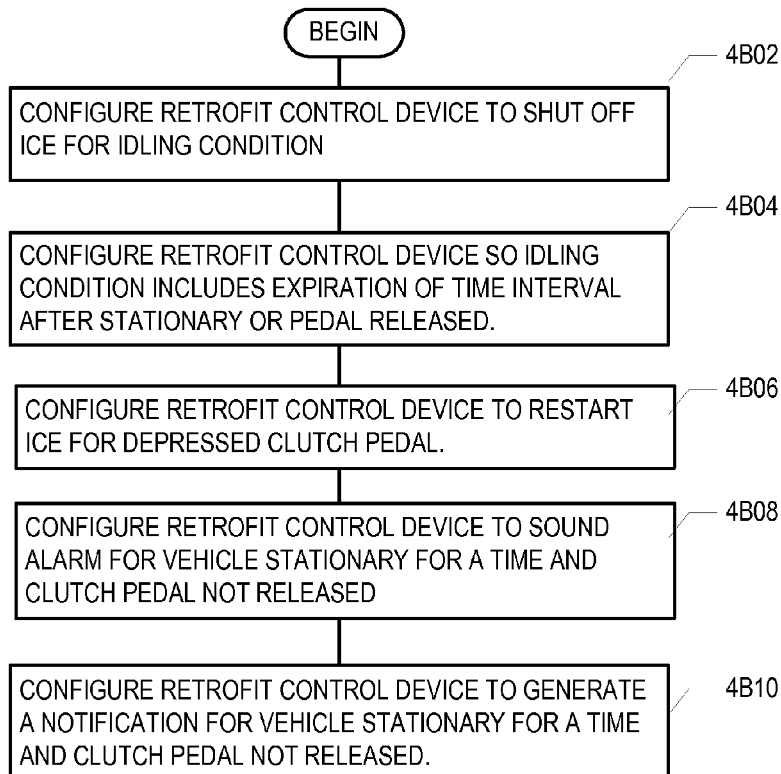
FIG. 4B illustrates certain aspects of retrofitting a vehicle for anti-idling features, according to embodiments of the invention.

Referring now to FIG. 4A, a flow chart illustrates certain aspects of retrofitting a vehicle for anti-idling a and/or cabin comfort features, according to embodiments of the present invention. (The actions shown do not necessarily have to be performed in the sequence indicated.) Retrofitting the vehicle may include installing 4A02 a battery and installing 4A04 auxiliary devices for operating the vehicle, including a coolant compressor for air-conditioning and a fen for cooling a radiator. Further, retrofit electric drivers may be installed 4A06 for the auxiliary devices. The vehicle has an internal combustion engine coupled to a drive train for propelling the vehicle. For the auxiliary devices driven by the retrofit electric drivers, the retrofitting may include removing 4A08 corresponding auxiliary devices that were mechanically driven by the internal combustion engine.

A converter is installed 4A10, such that, the electric drivers may be supplied by the converter and the converter is supplied by the battery. An electric generator is installed 4A12 and a battery charger is installed 4A14 such that it supplies the battery and is supplied by the generator. The vehicle has an internal combustion engine coupled to a drive train for propelling the vehicle, and the retrofitting may include coupling 4A14 the internal combustion, engine to the generator for driving the generator to charge the battery.

The vehicle has an air compressor drive gear driven by the internal combustion engine for supplying air brakes. In an aspect, removing 4A08 corresponding auxiliary devices that were mechanically driven by the internal combustion engine may include removing 4A08A the air compressor driven by the internal combustion engine air via the compressor drive gear. For this arrangement, coupling 4A16 the internal combustion engine to the generator may include coupling 4A16A. the generator to the internal combustion, engine via a PXU coupled to the air compressor drive gear. Alternatively, coupling 4A16 the internal combustion engine to the generator may include coupling 4A16B the generator to the internal combustion engine via a cog belt. Alternatively, the vehicle may include a manual transmission having a power takeoff port, and coupling 4A16 the internal combustion engine to the generator may include coupling 4A16C the generator to the internal combustion engine via a PXU coupled to the manual transmission via the power takeoff port.

According to embodiments of the present invention, VCM 180 may be configured to shut off ICE 150 for anti-idling (while keeping parasite loads running via electric drivers to the extent they may be demanded, such as for cabin comfort) in response to a combination of vehicle 100 being stationary and clutch pedal 155 being released, which may be referred to herein as an automatic anti-idling condition. This arrangement provides fuel savings due to shutting off ICE 150 during idling and provides a particularly effective user interface.

Anti-idling requirements may demand that the ICE is shut off even for relatively short idling intervals. Conventional ways of turning off the ICE for short intervals tend to introduce operational complexity, which creates difficulties for human drivers. Therefore, it is advantageous to make vehicle operation intuitive and unobtrusive. This is not necessarily easy to address. For example, when shutting off the ICE responsive to the vehicle being stationary for a predetermined time, it is difficult to predict the amount of time each short period of stationary operation might exist. For instance, the amount of stationary time at an urban stoplight and a rural stop sign might vary dramatically. Consequently, when a mere stationary time limit is used to control shutdown, it is likely that ICE propelled movement could be initiated only moments after shutoff. Such a scenario introduces a doubly negative outcome, wherein the ICE operates longer than necessary while the vehicle is stationary and then shuts off only seconds before it is needed again to propel the vehicle.

In order to address this problem, embodiments of the present invention, use both vehicle speed and clutch 153 positions to control shutdown of ICE 150. This is rather non-intuitive, because in heavy duty vehicles, drivers often shift without use of the clutch. However, it should be understood that in order to reach zero mph with the ICE running, a driver must either hold the clutch pedal 155 down or else shift into neutral or both, and drivers will tend to shift into neutral if they expect a longer than momentary stop, because it is relatively hard to hold the clutch pedal down. By providing control device 170 configured to use the combination of vehicle speed and clutch pedal, position to trigger shut down, this takes advantage of the tendency of drivers to hold down the clutch pedal only when a short stop is expected. The result is an immediate shutdown of the engine once the driver has come to a stop and expects a longer than momentary wait, as indicated by shifting into neutral and then releasing the clutch pedal. After detecting that the vehicle is stationary, shutting down the ICE responsive to clutch position instead of responsive to expiration of a substantial time interval avoids the undesirable possibility of the timer shutting down the ICE just as it is again needed to propel the vehicle. In another embodiment, control device 170 shuts down ICE 150 in response to an additional, condition, that is, expiration of a short time interval after releasing clutch pedal 155, such as a predetermined time interval in the range of 1 to 15 seconds.

Control device 170 may be configured to generate and store a data record responsive to detecting that vehicle 100 is stationary and expiration of a predetermined time interval thereafter, where clutch pedal. 155 has not been released. The record is generated in this condition because the condition indicates the driver may be intentionally overriding automatic shutdown of ICE 150. Alternatively, control device 170 sends the data record to a remote data acquisition system. Vehicle 100 may include an audible alarm device, which may be heard by the driver in the cabin when actuated, and control device 170 causes actuation of the alarm responsive to detecting that vehicle 100 is stationary and expiration of a predetermined time interval thereafter, where clutch pedal 155 has not been released.

Once control device 170 has automatically shut down vehicle 100 responsive to detecting the anti-idling condition, e.g., the vehicle operator once again depressing clutch pedal 155, the vehicle operator may start vehicle 100 with an ignition switch in a conventional manner. As long as the driver does not turn the ignition switch to the off position, during idling, vehicle control module ISO (also referred to as "VCM," "vehicle integration module," or "VIM") stays in the idling mode, i.e., with ICE off. If the ignition key is turned to off, however, control logic shuts down the vehicle and does not stay In the pre-idling mode selection state. Control device 170 may alternatively be configured to automatically restart ICE 150 responsive to actuation of a driver operated pushbutton, a motion of the steering wheel caused by the driver, such as detected by a sensor coupled to the steering wheel, or steering linkage for detecting a jogging or shaking motion of the steering wheel, or by automatic sensing of engine temperature falling below a predetermined setpoint Referring now to FIG. 4B, a flow chart illustrates certain aspects of retrofitting a vehicle for anti-idling Features. (The actions shown, do not necessarily have to be performed in the sequence indicated.) The vehicle has a manual transmission in the drive train and a clutch in the drive train for disengaging the internal combustion engine from the manual transmission responsive to a clutch pedal being depressed. Retrofitting the vehicle may include configuring 4B02 a retrofit control device to automatically shut off the internal combustion engine in response to detecting an idling condition, wherein the idling condition may include a combination of a first condition In which the vehicle is stationary and a second condition in which the clinch pedal is released. Alternatively, the second condition may include the transmission being shifted to neutral Alternatively, the detected idling condition may include a combination of a first condition in which the vehicle is stationary and a second condition in which the transmission is shifted to neutral. Alternatively, the idling condition may include a combination of a first condition in which the vehicle is stationary, a second condition in which the clutch pedal is released, and a third condition in which the transmission is shifted to neutral.

Alternatively, the combination may include 4B04 another condition in which a predetermined time interval, has expired after the first or second condition or the first and second condition. The retrofit control device may be configured 4B06 to automatically restart the internal combustion engine responsive to detecting the clutch pedal being depressed or responsive to the transmission being shifted to neutral.

Alternatively, the retrofit control device may be configured 4B08 to automatically sound an alarm responsive to detecting a condition in which the vehicle has been stationary for a predetermined time interval during which, the clutch pedal has not been released. The retrofit control device may be configured 4B10 to automatically generate a notification responsive to detecting a condition in which the vehicle has been stationary for a predetermined time interval during which the clutch pedal been not released.

In addition to recapturing energy by regenerative braking, control device 170 may load up generator 160 at a programmed charging rate to recharge battery 165 when ICE 150 is running. Because day-to-day drive times may be variable, a way of selecting a charging program is provided that presents an intuitive driver interface, and yet achieves good fuel economy. VCM 180 may include a small interface in the vehicle 100 cabin that activates whenever ICE 150 is turned on or a state of vehicle control device 170 is changed from cabin comfort: mode to a mode for over the road operation. Control device 170 may control the programmed rate responsive to driver selecting a predetermined charge time via the interface, where the driver selection indicates the time the driver estimates vehicle 100 will be driven during the day, e.g., 8 hour cycle, 7 hour cycle, etc. (In an embodiment, control device 170 has an 8 hour charge time default which control device 170 automatically selects if driver does not manually select a charge cycle.) This programmed charging may include a fixed base charging rate and intermittent charging that arises for regenerative braking. The base charging may be essentially independent of vehicle 100 speed, engine RPM, and accelerator pedal 155 position. This may include control device 170 varying excitation of generator 160 to compensate for varying speed of ICE 150 in order to produce a substantially constant generator 160 output for the base charging rate. That is, control device 170 automatically regulates load of generator 160 on internal combustion engine 150 for the base charging. However, in art embodiment, programmed base charging is suspended responsive to ICE 150 less than a predetermined speed, such as 1200 RPM.

For a selected charge time, control device 170 may control generator 160 output to produce a base charging rate of $\{P+[C-(S\times C)]/H\}\times(1+L)$, where P=parasite loads, amperes C=battery capacity, ampere-hours S=battery state of charge, per unit (i.e., full charge=1)

L=losses, per unit

H=selected charge time, hours.

For example, if the parasite loads total 30 amperes, the one hour battery capacity is 100 ampere-hours, the stats of charge at the beginning of the charge time is 20% (i.e., 0.2 per unit), the losses may be 10% (which is a predetermined, fixed value in embodiments of the invention), and the selected charge time is 8 hours, then control device 170 regulates generator 160 output to provide a base charging rate of {30 amperes+[100 ampere-hours−(0.2×100 ampere-hours)]/8 hours}×(1+0.1)=(30 amperes+10 amperes)×(1.1) =44 amperes.

Regenerative braking produces recharging of battery 165 in addition to the programmed base rate. For at least this reason, control, device 170 senses battery 165 state of charge at predetermined intervals, determines how much time is remaining of the selected charge time, and responsively adjusts the base-charging rate. For example, if control device 170 checks at 10 minute intervals and in one instance 4 hours are remaining and the state of charge is now 68%, then control device 170 regulates generator 160 output to provide a new base charging rate of {30 amperes+[100 ampere-hours−(0.68×100 ampere-hours)]/4 hours}×(1+0.1) =(30 amperes+8 amperes)×(1.1)=41.8 amperes.

Note that this arrangement is rather counterintuitive. That is, it would be logical to recharge battery 165 as quickly as is reasonably possible due to uncertainties about when battery 165 may be needed. However, embodiments of the present invention involve recognition that at least in some circumstances it may be useful to somewhat sacrifice greater certainty that, would come with recharging more quickly in order to get greater efficiency by recharging the battery more slowly. (Recharging more slowly produces less battery 165 temperature rise. Battery 165 impedance-and hence loss-increases with increasing battery temperature. Therefore, less energy is needed to recharge more slowly.)

To address the uncertainty issue, control device 570 may also include a "zero" hour charge cycle for fast charging, wherein responsive to control device 170 detecting that vehicle 100 is stationary and fast charge is requested, control device 170 takes control of engine 150 speed and ramps ICE 150 throttle up to achieve a predetermined ICE rotational speed and controls generator 160 excitation to generate a charge rate of at least 100% battery charge capacity per hour. (A charge rate of 100% battery capacity per hour is often referred to as a "1C" rate.) In embodiments, for example, control device 170 ramps ICE 150 up to 1800 rpm for the zero hour charge cycle and charges at the maximum output of generator 160 for this 1800 rpm speed, which is at least a 1C rate. Battery 165 may charge in less than one hour at this rate, because the rate may exceed 1C and because battery 165 may not have been fully discharged.

Control device 370 senses battery 165 state of charge and automatically .shuts down ICE 150 when battery 165 is fully charged. It should be appreciated that this "zero" hour charge cycle may be used by the driver to recharge battery 165 while the driver rests and even sleeps, since the automatic shut down of ICE 150 may occur unattended. Control device 170 may include a safety interlock, wherein control device 170 will not increase ICE 150 throttle, i.e., ICE demand signal above idle unless control device 170 senses hand brake 155 is engaged. In an alternative, the safety interlock may include sensing gear box of transmission 154 is in neutral as a precondition for increasing ICE 150 throttle above idle.

A temperature sensor that measures ambient temperature outside the vehicle cabin may be provided, along with a data record stored in a memory of control device 170. The data record Indicates how much power is required to cool the cabin for predetermined cabin temperature set points, time intervals, and outside temperatures. The required power is expressed as a battery 165 required state of charge. In addition to receiving input from the driver indicating the selected time for a rest interval and desired cabin temperature, control device 170 detects the outside temperature. Then control device 170 looks up in the stored record a required battery charge to support cabin comfort for the selected time and temperature set point at the detected outside temperature. Then control device 170 controls fast charging while monitoring battery state of charge, and stops charging when the battery reaches the required state of charge determined by the lookup operation. Alternatively, an algorithm is provided in the memory for calculating the required power as a function of a cabin temperature set point, selected time interval, and outside temperature. According to this alternative, by using the stored algorithm, a microprocessor of control device 170 determines the required battery charge to support cabin comfort for the selected time and temperature set point at the detected outside temperature.

Control device 170 may be configured to receive a driver input from a user interface that indicates a sleep mode operation of cabin air conditioning, i.e., operation during a driver rest interval (during which the vehicle is stationary and the driver rests and may even sleep), and to responsively measure actual rate of power use during the sleep session, Using this rate, control device 170 computes required battery 165 power, i.e., power that will be used in the remaining time of the rest interval. Responsive to determining that required power exceeds current state of charge of battery 165, control device 170 determines from the historical record a new cabin temperature set point for the current outside temperature and remaining time interval that would require power consumption no greater than the current state of charge of battery 165 and changes the cabin temperature set point to the new set point. This may be done based on a premise that it would be undesirable for the driver to have to wake up to recharge the battery in order to maintain a comfortable temperature, and/or on a premise that it is worse to encounter an extremely uncomfortable temperature for a short while at the end of the rest interval (due to running out of battery charge) than to maintain a relatively less uncomfortable temperature, but for a somewhat longer time interval.

Figure 4C:
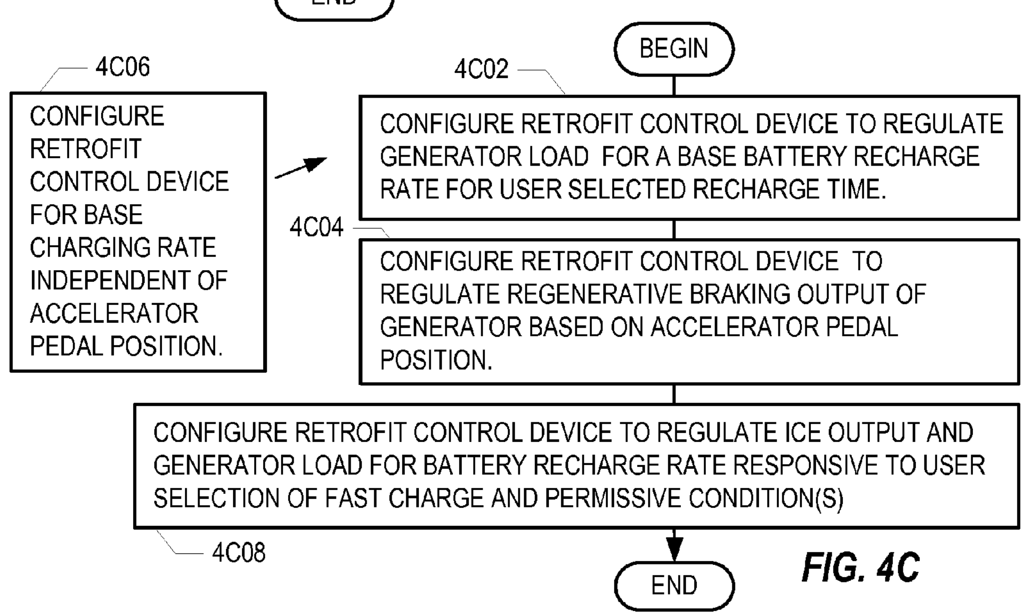
FIG. 4C illustrates certain battery recharging related aspects of retrofitting a vehicle for anti-idling, and/or cabin comfort features, according to embodiments of the invention.

Referring now to FIG. 4C, a flow chart illustrates certain battery recharging related aspects of retrofitting a vehicle for anti-idling and/or cabin, comfort features. (The actions shown do not necessarily have to be performed in the sequence indicated.) Retrofitting the vehicle may include configuring 4C02 a retrofit control device to automatically regulate a base charging rate load of the generator (e.g., generator 160 in FIG. 1) on the internal combustion engine to provide a base rate of battery (e.g., battery 165 in FIG. 1) recharging responsive to user selection of a recharge time. The vehicle may have an accelerator pedal for driver control of mechanical output of the internal combustion engine, and the retrofitting may include configuring 4C04 the retrofit control device to detect position of the accelerator pedal and to automatically regulate a regenerative braking output of the generator responsive to the accelerator pedal position. Further, the retrofitting may include configuring 4C06 the retrofit control device to provide the automatically regulated, base generator charging rate load on the internal combustion engine, wherein the base battery recharging rate is essentially maintained independent of the accelerator pedal position. Also, the retrofitting may include eon figuring 4C08 the retrofit control device to automatically regulate output of the internal combustion, engine and load of the generator on the internal combustion, engine to provide a predetermined battery recharge rate responsive to user selection of fast charge rate and detection of permissive conditions, which may include parking brake set. Alternatively, it may include a transmission shifted into neutral.

Figure 4D:
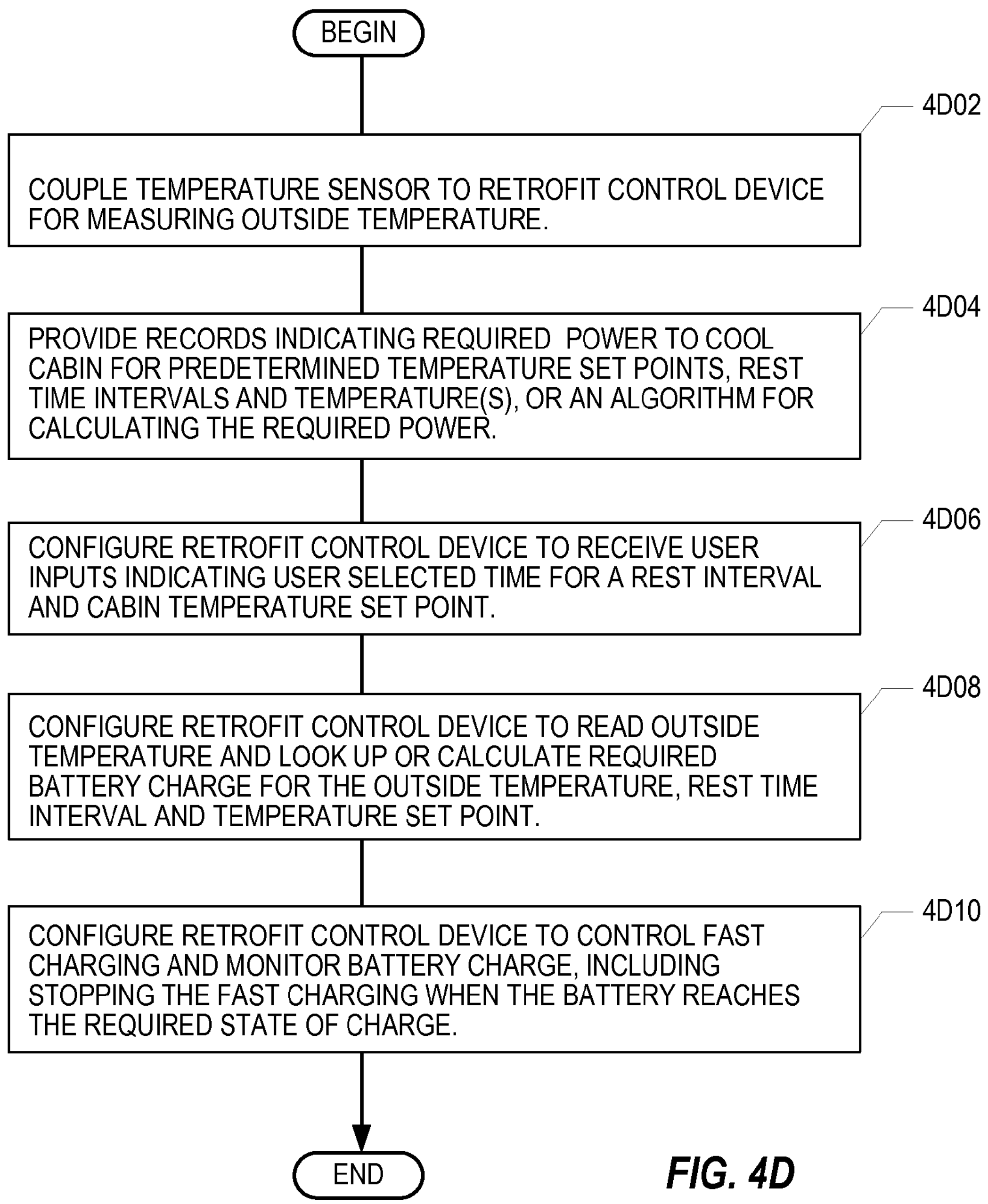
FIG. 4D illustrates battery recharging related aspects of retrofitting a vehicle for cabin comfort features, according to embodiments of the invention.

Referring now to FIG. 4D, a flow chart illustrates battery recharging related aspects of retrofitting a vehicle for cabin comfort features. (The actions shown do not necessarily have to be performed in the sequence indicated.) The retrofitting may include coupling 4D02 a temperature sensor to the retrofit control device, wherein the temperature sensor measures ambient temperature outside the vehicle cabin. In 4D04, data records may be stored in a memory accessible by retrofit control device indicating how much cabin comfort power is required to cool the cabin for predetermined parameters including cabin temperature set points, rest time intervals, and outside temperatures, or providing an algorithm in the memory for determining the required cabin comfort power as a function of the predetermined parameters. The retrofit, control device may be configured 4D06 to receive user inputs indicating user selected time for a rest interval and cabin temperature set point. The retrofit control device may also be configured 4D08 to determine, i.e., by looking up a data record for the given set point, time remaining, and temperature, or by executing the algorithm for these givens. It also may be configured 4D10 to control fast charging and monitor battery state of charge, which may include the retrofit control device stopping the fast charging when the battery reaches the required state of charge for the detected outside temperature and for the received rest time interval and temperature set point.

Figure 4E:
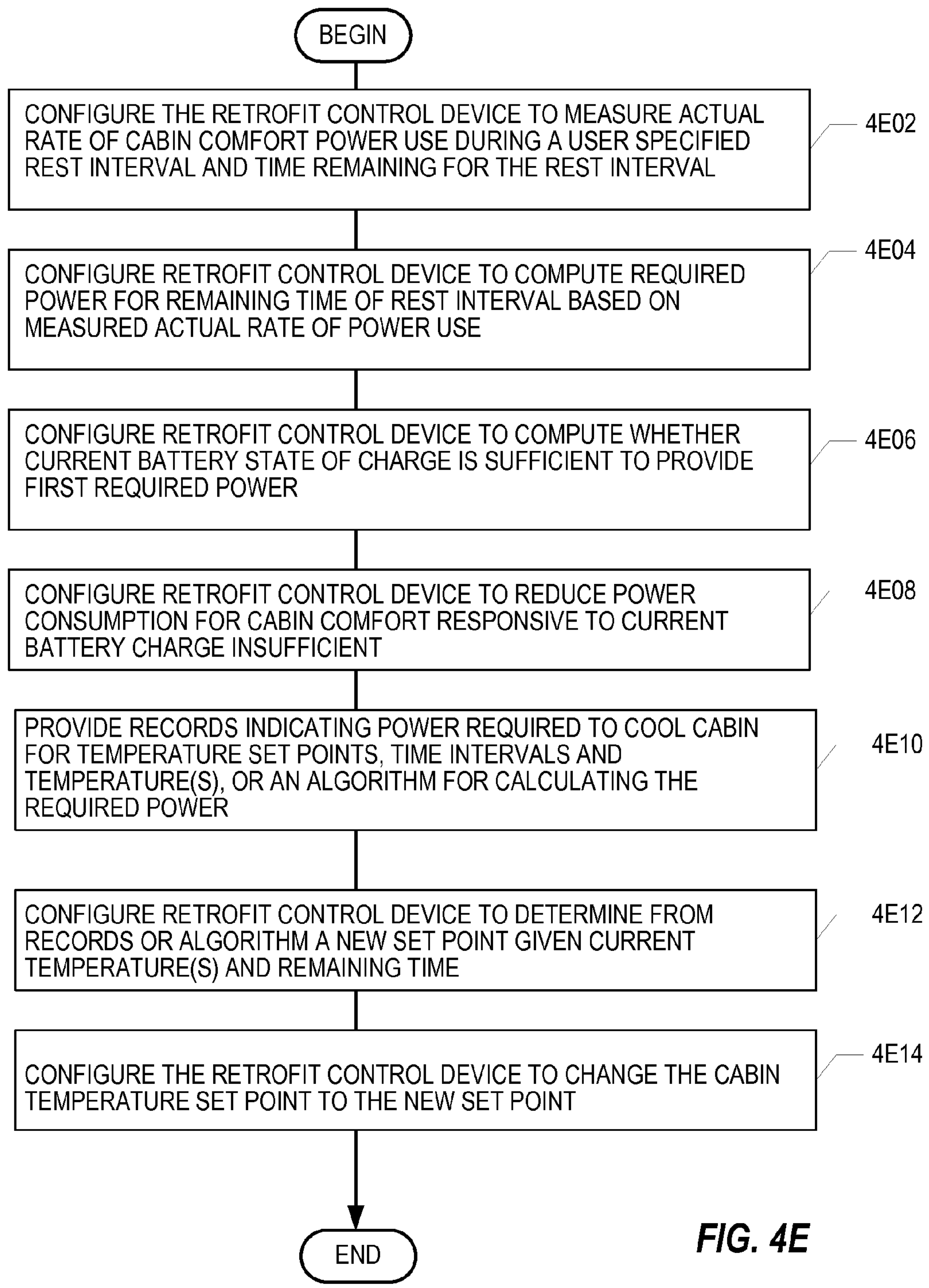
FIG. 4E illustrates cabin comfort and battery recharging aspects of retrofitting, according to embodiments of the invention.

Referring now to FIG. 4E, other cabin comfort and battery recharging aspects of retrofitting are illustrated. This may include configuring 4E02 the retrofit control device to measure actual rate of cabin comfort power use during a user specified rest interval and time remaining for the rest interval, and configuring 4E04 the retrofit control device to compute first required power that will be used in the remaining time of the rest interval based on the measured actual rate of cabin comfort power use. Further, the retrofit control device may be configured 4E06 to compute whether the current battery state of charge is sufficient to provide the computed first required power. The retrofit control device may also be configured 4E08 to then reduce power consumption for cabin comfort, responsive to detecting the existing state of battery charge, comparing it to the computed first required power and determining that current battery state of charge is not sufficient to provide the computed first required power.

As in FIG. 4D, the retrofitting shown in FIG. 4E may include providing 4E10 data records stored in a memory accessible by retrofit control device indicating how much cabin comfort power is required to cool the cabin for predetermined parameters including cabin temperature set points, rest time intervals, and outside temperatures, or an algorithm in the .memory for determining the required cabin, comfort power as a function of the predetermined parameters. The retrofit control device may be configured 4E12 to determine, i.e., by looking up a data record for the given set point, time remaining, and temperature or by executing the algorithm for these givens. A new cabin temperature set point for the current outside temperature and remaining time interval, wherein the new set point reduces power use such that the power that will be used in the remaining time of the rest interval based on the reduced rate of power use is no greater than the current state of charge of the battery. Reducing the power consumption 4E08 may include the retrofit control device causing the cabin temperature set point to change to the new set point.

As previously stated, control device 170 controls regenerative braking generator 160 outputs responsive to accelerator pedal 155 positions in at least some circumstances in embodiments, in an instance, control device 170 produces a generator 160 regenerative braking demand signal responsive to pedal 155 position, wherein with pedal 155 fully released, control device 170 produces a 100% regenerative braking demand signal. Control device 170 decreases the regenerative braking demand signal responsive to increasing pedal 155 displacement, up to a predetermined, zero-demand pedal 155 displacement position, such as midway to the cabin floor, or one quarter of the way to the cabin floor, to give two examples. Control device 170 generates a 0% regenerative braking demand signal responsive to pedal 155 displacement at or beyond the predetermined, zero-demand pedal 155 displacement position.

Control device 170 may control regenerative braking somewhat differently in cruise control mode. Specifically, when vehicle 100 cruise controller is in cruise control mode, control device 170 determines the vehicle 100 speed, cruise controller mode, cruise control set point, and cruise controller torque demand signal from a controller area network ("CAN"), which may be an OEM CAN. Generally speaking, in embodiments of the invention, control device 170 automatically applies regenerative braking selectively (in addition to programmed base charging of battery 165) by increasing generator 160 load responsive to decreasing cruise controller torque demand signal, or vehicle 100 speed above the cruise control set point, by a predetermined speed, or both.

In embodiments of the invention, once the regenerative braking condition is satisfied, i.e., so that regenerative braking is permitted, control device 170 automatically increases regeneration torque in a predetermined manner, which may be at a predetermined rate and may be independent of accelerator pedal position. The rate may increase in small, periodic steps, such as every 2 seconds. Alternatively, the rate includes a ramp function. Control, device 170 may automatically increase regeneration torque in proportion to decreasing cruise controller torque demand signal. Conversely, control device 170 may decrease regenerative braking responsive to increasing cruise controller torque demand signal and vehicle speed less than cruise control set point. That is, the rate may decrease in small, periodic steps, such as every 2 seconds. Or the rate may be a ramp function. Control device 170 may decrease regenerative torque so proportion to increasing cruise controller torque demand signal.

In the above described embodiments, control device 170 does not increase the regenerative torque demand signal all the way to the point that the engine cruise controller again requests acceleration torque from engine 150. Otherwise, such an overlap may cause ICE 150 and ET motor/generator 160 to "fight" each, other, negatively impacting operation, driver satisfaction, and fuel economy.

In embodiments of the invention, when regeneration braking is enabled in cruise control mode (e.g., responsive to vehicle 100 speed above cruise control set point by a predetermined speed, etc., as mention above), control device 170 may regulate regenerative braking responsive to accelerator pedal position, as in non-cruise control mode.

Deployment of code capable of controlling regenerative braking, during cruise control operation as described above allows recapture of vehicle momentum in a manner that, also permits effective operation of the cruise controller with no negative impacts to vehicle operation.

In embodiments, it may be problematic if a driver does not hold the accelerator pedal in its current position at a time when lie or she turns off cruise control That is, control device 170 for generator 160 demand is independent of accelerator pedal position during cruise control mode, in embodiments as described herein. But, when in non-cruise control mode, generator control device 170 may demand full regenerative braking of the generator if the accelerator pedal is in zero demand position, e.g., fully released. Thus, unless generator control device 170 is configured with a proper control override for transition from cruise control mode to non-cruise control mode, control device 170 may suddenly produce a full regenerative braking demand if the driver does not maintain the accelerator pedal at a zero regenerative braking demand position at a time when the driver turns off cruise control Accordingly, control device 170 may suspend automatic regenerative braking tor a predetermined time (such as a time within a range of 1 to 10 seconds) after turning off cruise control mode. Thereafter, control device 170 may slowly increase its response to the accelerator pedal (for producing the regenerative braking load signal to generator 160) at a predetermined rate over a predetermined, time (such as at a constant rate over a time within the range of 1 to 10 seconds after turning off cruise control).

Figure 4F:
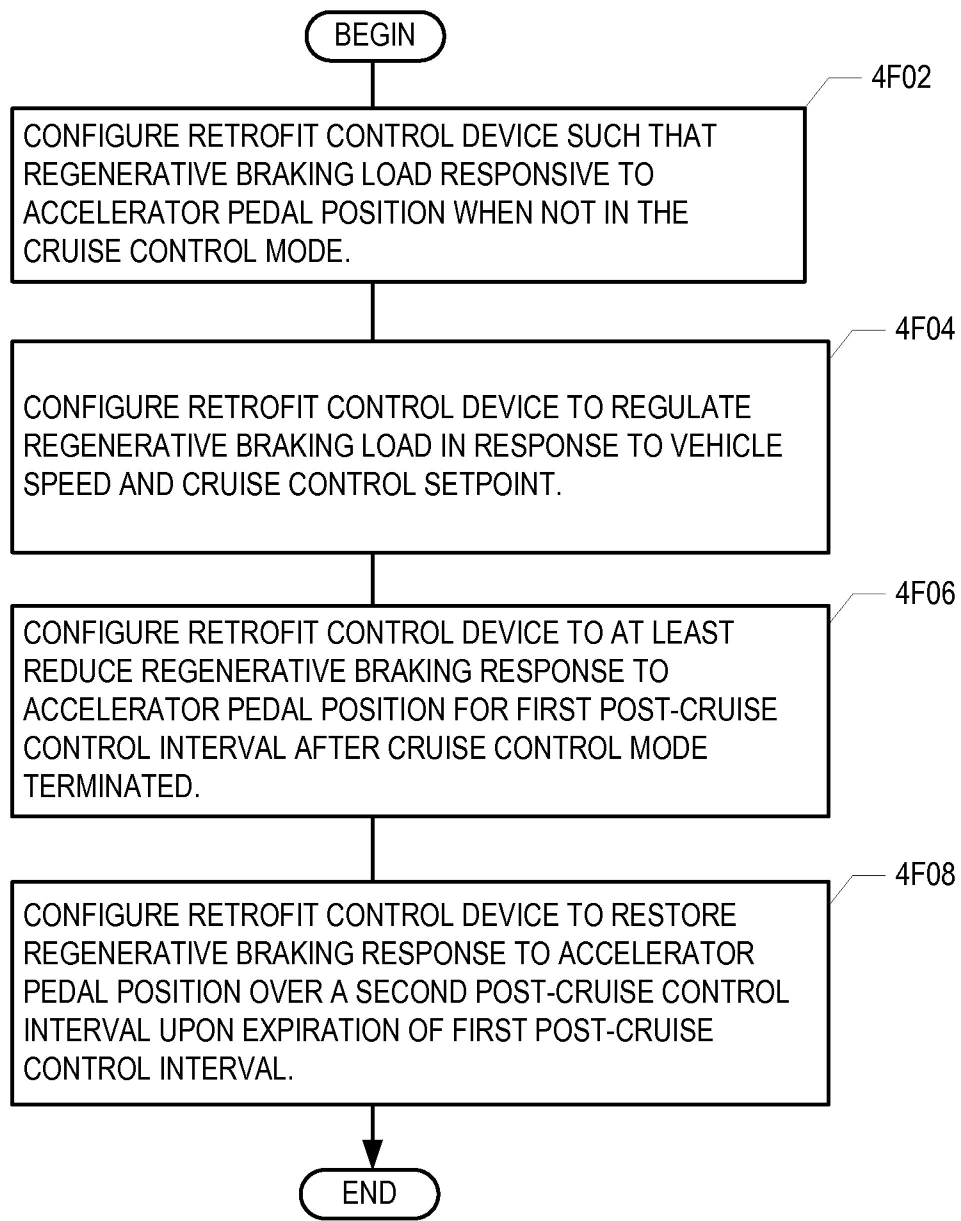
FIG. 4F illustrates certain cruise control related aspects of retrofitting a vehicle for anti-idling and/or cabin comfort features, according to embodiments of the invention.

Referring now to FIG. 4F, a flow chart illustrates certain cruise control related aspects of retrofitting a vehicle for anti-idling and/or cabin comfort features. (The actions shown do not necessarily have to be performed in the sequence indicated.) The vehicle may have a cruise controller configured for generating a cruise control torque demand signal to regulate output of the internal combustion engine responsive to vehicle speed and a cruise control set point when in a cruise control mode. Retrofitting, the vehicle may include 4F02 configuring the retrofit control device such that the regenerative braking load is responsive to accelerator pedal position when the cruise controller is not in the cruise control mode, and 4F04 configuring the retrofit control device to regulate the regenerative braking load in response to i) a decrease in the cruise control torque demand signal, and ii) a vehicle speed greater than the cruise control set point when the cruise controller is in the cruise control mode.

In another aspect, the retrofitting may include 4F06 configuring the retrofit control device to suspend or at least reduce its regenerative braking response to the accelerator pedal position for a first post-cruise control time interval after the cruise control mode is terminated. In another aspect, the retrofitting may Include 4F08 configuring the retrofit control logic to restore the regenerative braking response to the accelerator pedal position, over a second post-cruise control, time interval, wherein the restoring is responsive to expiration of the first post-cruise control time interval.

There are currently a number of "cabin comfort air-conditioning systems" on the market, i.e., air-conditioning systems that operate from a power source, independent of ICE 150. While some use APUs and others use rechargeable batteries, all use cumbersome and redundant components to provide temperature conditioning and air movement through the cab. In embodiments of the present invention, original components may be reused, thus improving visual appeal, reducing space required for the retrofit system, and reducing the number of components (and thus cost) required.

A high voltage (e.g., 240 V, 3-phase AC) powered air-conditioning compressor, which is used for cooling both during driving and while the vehicle is stationary, may be powered by controller 176 sourced by high voltage batteries 165. Controller 176 turns compressor motor 132 on and off responsive to a cabin temperature demand signal (from a thermostat in the cabin), which may be communicated to controller 176 by the same signal wire that originally controlled the compressor clutch that turned the original air-conditioning compressor on and off. When the vehicle is stationary, such as when the engine is off, controller 176 may receive either the cabin temperature demand signal or a temperature demand signal from a thermostat located in the sleeper compartment of the cab. Meanwhile, rather than providing redundant components, these embodiments may provide a converter 172 to supply the original air-conditioning, forced air, control, and ventilation components. Thus, a hybrid cabin comfort system is provided, wherein an original compressor and drive arrangement is replaced by a more efficient arrangement, including electric motor drivers. Well integrated, original 12 VDC ventilation, control and forced air systems may be retained and supplied by the same high voltage battery as the retrofit parasite load drivers. By supporting many original components via the original 12 VDC system, the user interface and operating modes may remain the same. Thus, the user does not have to deal with much change in the operation of cabin comfort systems.

An additional benefit of the 12 VDC converters is that it maintains the original 12 VDC battery state of charge, and thereby supplies loads such as radio and parking lights even during extended stationary idling. This constitutes a further improvement from other cabin comfort systems currently available, since they are dependent on occasional starting of the OEM engine to maintain the 12 VDC battery state of charge, In addition to being useful during periods of extended idling, this system continues operation seamlessly at times when the engine is shut off for only short, periods of time. There is no auxiliary power unit or auxiliary air-conditioner to switch on, as is the case with other cabin comfort systems. This functionality is useful, because it fends to prevent unwanted transit idling (short term ICE idling, such as at stoplights, stop signs, or loading bays). Because many cargo trucks currently in operation spend a great deal of transit time at idle, it is useful to shut the ICE off for these short periods. Embodiments of the fully integrated system described herein allow the ICE to be automatically shut off for short and. intermediate time durations repeatedly without causing additional driver tasks.

Control of the interface may be achieved in a variety of ways, according to different embodiments. For instance, the interface may be connected to a GPS or mapping system where once a destination and route are established, the drive time is calculated and thus provided to VCM 180 for setting of the charging rate and Protocol. To the extent such a system is utilized, the GPS or mapping system may further advise the VCM 180 of the expected speeds, number of stops, or other conditions that may affect desired rate of charge over the course of the drive.

The interface may also accept other data from a mapping system, satellite, or driver. Such other information may include route, distance, expected speeds, expected, drive time, sections of the drive which may allow only certain speeds or which may contain more required stops, elevation of roads along the route, road or weather conditions that may affect drive time and/or actual speed. Based upon these inputs, VCM 180 may adjust battery rate of charge in advance to improve fuel economy. For instance, a route may be determined, by, or input to, VCM 180. Then, if VCM 180 determines, such as by access to GPS data and a road information database, that the route ends with a very long downhill run (such as from a mountain pass), VCM 180 may automatically lower the battery charge rate over the initial portion of the route, thus allowing full use of energy that will be available from regenerative braking on the downhill portion, in other words, VCM 180 may greatly increase fuel efficiency by planned regenerative braking and reduced recharging load on ICE 150, while still attaining full battery charge by the end of the route.

In one or more embodiments of the invention, generator 160 may be coupled to ICE 150 in an ICE mode of operation without a way for the driver to disengage generator 160 from ICE 150 while driving. In those one or more embodiments, regenerative braking tends to occur concurrently with ICE 150 contributing to slowing of the vehicle. (One exception to this is in an embodiment wherein the generator is coupled to the drive train downstream of 153 clutch, e.g., via a PXU 156 through transmission/PTO port 154, and wherein while slowing vehicle 100 the driver also manually depresses the clutch pedal 155 to disengage ICE 150 from the transmission 154.) If ICE 150 is also slowing vehicle 100 and is coupled to generator 160, this may tend to reduce the regenerative braking load on generator 160, which may be undesirable because less energy is being recaptured and stored in battery 165. Consequently, control device 170 may be configured to reduce compression of ICE 150 during regenerative braking so that generator 160 contributes to slowing of vehicle 100 much more than does ICE 150.

It is known to use a vehicle's engine for braking, also known as "Jake braking," according to which resistance to flow of combustion gases through the engine is provided by various means. According to embodiments of the present invention, an opposite arrangement is provided wherein, responsive to VCM 180 receiving an indication that clutch 153 is engaged and -accelerator pedal 155 is fully released, VCM 180 triggers release of waste gases via engine 150 cylinders or otherwise reduces engine backpressure, such as by varying engine timing. Such reduction of engine drag allows more vehicle slowing by the generator 160, which increases the amount of electrical energy production during a regenerative braking event. In some embodiments, generator 160 size is accordingly increased to provide regenerative braking to be equivalent to customary engine 150 braking.

A creep switch may be implemented among operator devices 155 and provided on the dash in the cabin along with an associated display. Responsive to control device 170 detecting activation of the creep switch, control device 170 causes the display to present a creep mode indication. Responsive to control device 170 detecting that the creep switch is on, that clutch pedal is depressed (which is another one of operator devices 155), and that a jog switch is activated (another one of operator devices 155), control device .170 energizes motor/generator 160 in the motoring mode, which moves vehicle 100 slowly via manual transmission 154. The jog switch may be located on the gear shifter (another of operator devices 155).

Referring again, to FIG. 1, devices are shown that, may be involved in a control algorithm for controlling fan motor 131, for embodiments of the present invention. VCM ISO may initially respond to ICE 150 temperature exceeding a predetermined temperature by signaling controller 176 to turn on fan motor 131 at one quarter speed. Then, if VCM 180 determines that the ICE temperature (as indicated by one or more of sensors 157) continues to exceed the predetermined level for a predetermined time interval, VCM 180 may signal controller 176 to increase fan motor 131 speed to one half speed. After this, if VCM 180 once again determines that ICE 150 temperature continues again to exceed the predetermined level for another instance of the predetermined time interval, VCM 180 may once again signal controller 176 to increase fan motor 131 speed by one quarter, i.e., to three quarter speed. Then, if VCM 180 once again determines that ICE 150 temperature continues to exceed the predetermined level for another instance of the predetermined time interval, VCM 180 may signal controller 176 to increase fan motor 131 speed by one quarter, which is to full speed.

In another aspect, a more aggressive control response may foe provided in a situation wherein VCM 180 detects a more significant demand. That is, if VCM 180 determines that, the ICE temperature exceeds a predetermined temperature level for a predetermined time interval even though vehicle 100 speed is greater than a predetermined speed, VCM 180 may signal controller 176 to increase fan motor 131 speed by more than one quarter speed. VCM 180 may signal controller 176 to increase fan motor 131 speed by one half speed. Alternatively, VCM 180 may signal controller 176 to immediately increase fan motor 131 speed to full speed.

Figure 4G:
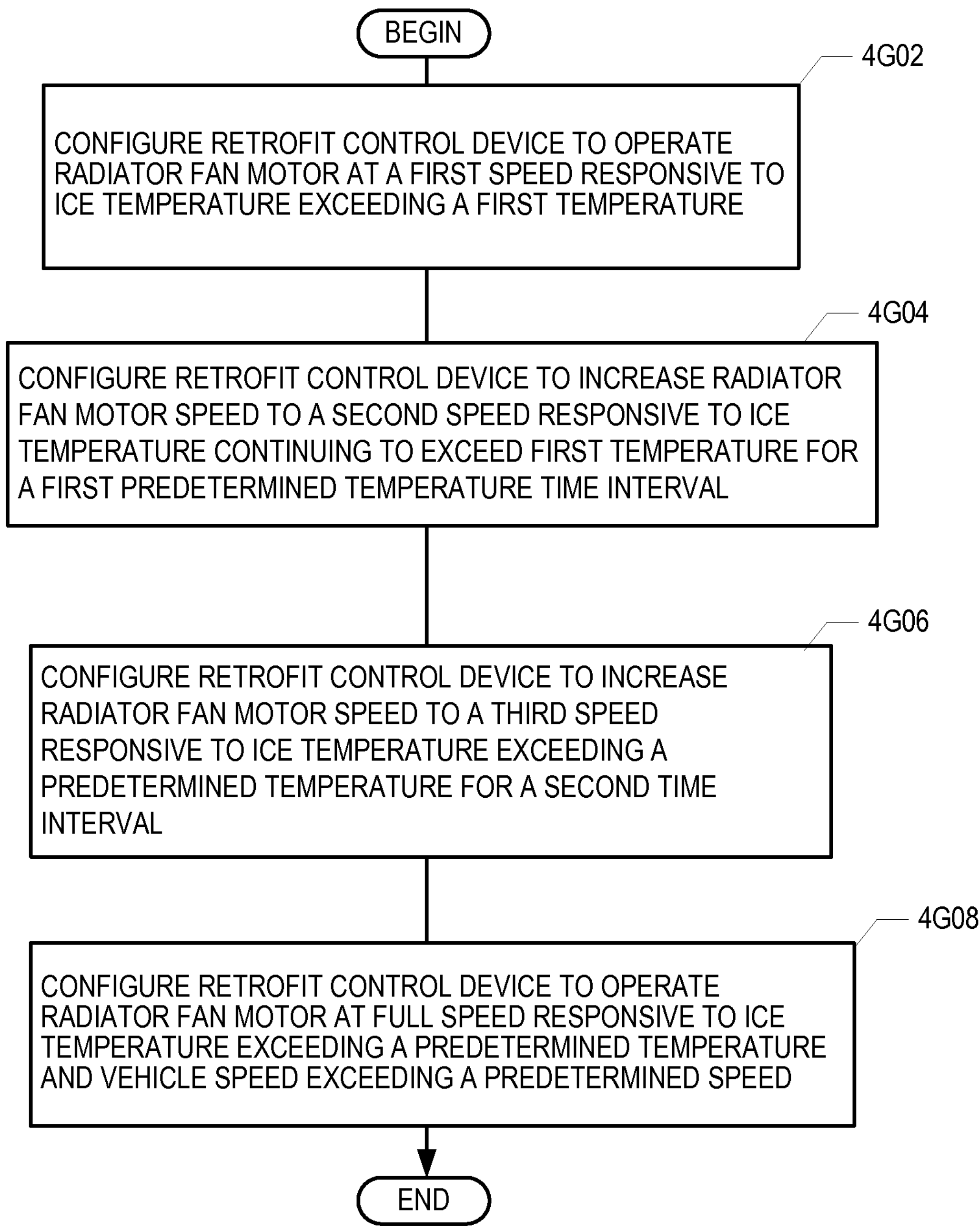
FIG. 4G illustrates certain radiator fan control related aspects of retrofitting a vehicle for anti-idling and/or cabin comfort features, according to embodiments of the invention.

Referring now to FIG. 4G, a flow chart illustrates certain radiator fan control related aspects of retrofitting a vehicle for anti-idling and/or cabin comfort features, according to embodiments of the invention. (The actions shown do not necessarily have to be performed in the sequence indicated.) Retrofitting the vehicle may include configuring 4G02 the retrofit control device to turn on a radiator fan motor at a first predetermined speed responsive to ICE temperature exceeding a predetermined temperature. The retrofit control device may be configured 4G04 to increase the radiator tan motor speed to a second predetermined speed responsive to ICE temperature continuing to exceed the predetermined temperature for a first predetermined temperature time interval. The retrofit control device may be configured 4G06 to increase the radiator fan motor speed to a third predetermined speed responsive to ICE 150 temperature continuing to exceed the predetermined temperature for a second predetermined temperature time interval. The retrofit control device may be configured 4G08 to operate the radiator fan motor at fail, speed responsive to ICE temperature exceeding a predetermined temperature and vehicle speed exceeding a predetermined speed.

There are auxiliary power units on the market that attempt to address the overnight idling problem, but they do not address transit idling, partly because they are not integrated into the OEM components, ("Transit idling" refers to vehicle stopping with the engine running during transit, such as at stop signs and traffic lights, in stop and go traffic, and for delivery stops. "Anti-idling" refers to elimination of the vehicle engine running while the vehicle is stopped.) Also, there may be anti-idling strategies, both aftermarket and OEM, that simply shut off the engine after the truck sits stationary for a substantial time, but that do not address cabin comfort, since they do not electrify the air-conditioning system and do not have energy storage capacity to do so. Embodiments of the present invention address a number of problems, including transit idling, overnight idling, cabin comfort, and fuel economy, based on research of vehicles in specific applications, driver behavior, historical, drive cycles, and how the technology applied herein may be compatible with those vehicles, drivers and drive cycles, and may provide fuel savings in the context of those drive cycles.

Figure 6A:
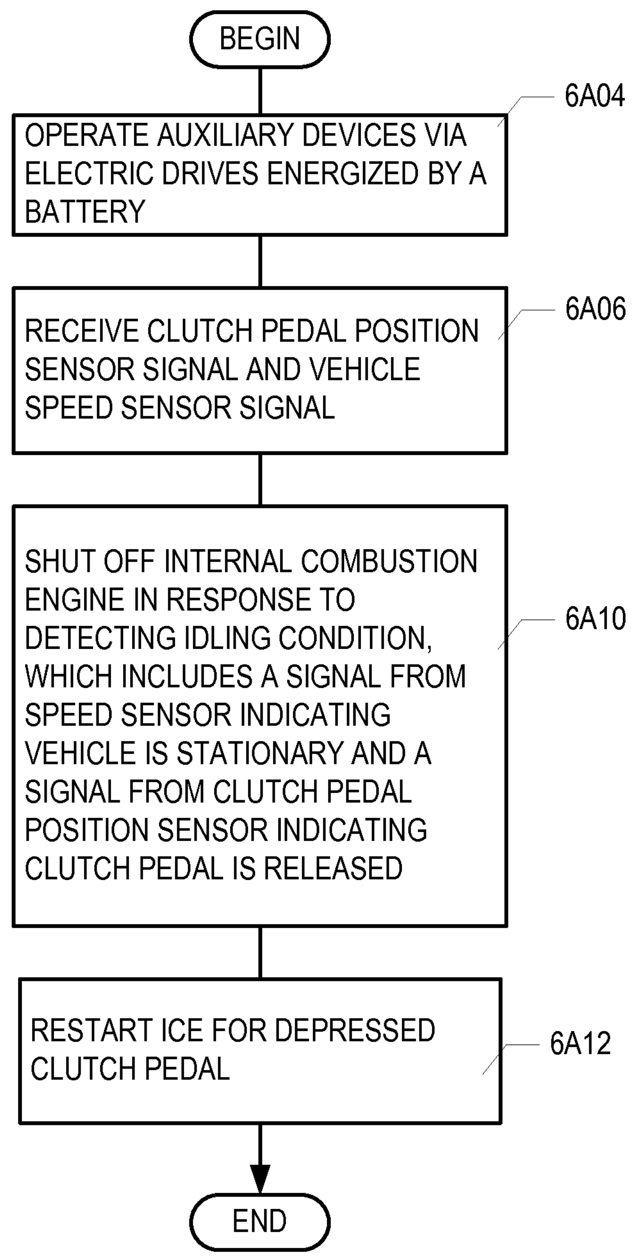
FIG. 6A illustrates general aspects of a vehicle with anti-idling features, according to embodiments of the invention.

FIGS. 6A-6E following illustrate aspects of operating a vehicle, such as vehicle 100 of FIG. 1, according to embodiments of the invention. Referring now to FIG. 6A, a flow chart illustrates, for embodiments of the invention, certain aspects of controlling a vehicle 100 (FIG. 1) having a clutch in the drive train for disengaging the internal combustion engine from the manual transmission via a clutch, such as by a clutch pedal being depressed. The vehicle operates 6A04 auxiliary devices energized by a battery, including an air-conditioning coolant compressor and a fan for an engine-cooling radiator, according to embodiments of the present invention. The retrofit control device receives 6A06 a clutch pedal position sensor signal and a vehicle speed sensor signal. The retrofit control device automatically shuts off 6A10 the internal combustion engine in response to detecting an idling condition, including detecting a first condition, in which the control device receives a signal from the vehicle speed sensor indicating the vehicle is in a stationary state, and a second condition, in which the control device receives a signal from the clutch pedal position, sensor indicating the clutch pedal is in a released stats. The retrofit control device may restart 6B12 the infernal combustion engine responsive to receiving a signal from a clutch pedal position sensor indicating the clutch pedal is depressed. In embodiments, the restarting may be in response to fully depressed clutch pedal In others, the restarting may be in response to a partly depressed clutch pedal.

Figure 6B:
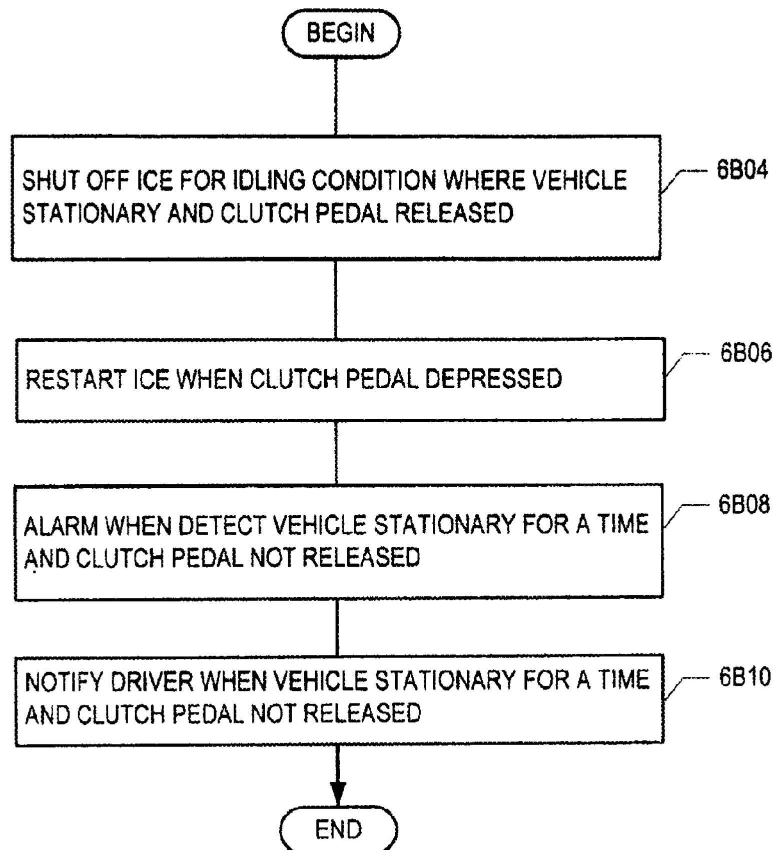
FIG. 6B illustrates certain aspects of a vehicle with anti-idling features, according to embodiments of the invention.

Referring now to FIG. 6B, a flow chart illustrates certain aspects of vehicle 100 operation, according to embodiments of the invention. The vehicle has a manual transmission in the drive train and a clutch in the drive train for disengaging the internal combustion engine from the manual transmission responsive to a clutch pedal being depressed The retrofit control device automatically shuts off 6B04 the internal combustion engine in response to detecting an idling condition, including detecting a first condition, in which the control device receives a signal from the vehicle speed sensor indicating the vehicle is in a stationary state, a second condition, in which the control device receives a signal from the clutch pedal position sensor indicating the clutch pedal is in a released state, and a third condition in which a predetermined time internal has expired after the first or second condition. The retrofit control device may restart 6B06 the internal combustion engine responsive to receiving a signal from a clutch pedal position sensor indicating the clutch pedal is depressed. In embodiments, the restarting may be in response to fully depressed clutch pedal. In others, the restarting may be in response to a partly depressed clutch pedal.

Alternatively, the retrofit control device activates 6B08 an alarm responsive to the control device detecting a condition in which the vehicle has been in a stationary state for a predetermined time interval and the clutch pedal has not been released during the predetermined time interval. The retrofit control device may generate 6B10 a notification to the driver responsive to the control device detecting a condition in which the vehicle has been in a stationary state for a predetermined time interval and the clutch pedal has not been released during the predetermined time interval.

Figure 6C:
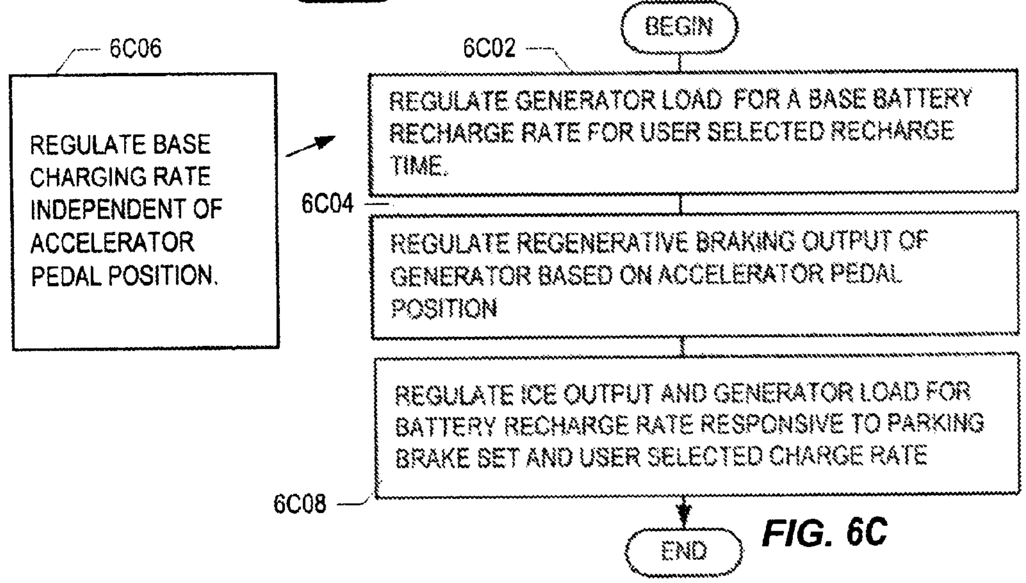
FIG. 6C illustrates certain battery recharging related aspects of a vehicle with anti-idling features, and/or cabin comfort features, according to embodiments of the invention.

Referring now to FIG. 6C, a flow chart illustrates certain battery recharging related aspects of vehicle 100, according to embodiments of the invention. The retrofit control device regulates 6C02 a base load of the generator to provide a base rate of battery recharging responsive to a predetermined recharge time, which may be user selected or a predetermined default time. The vehicle has an accelerator pedal for driver control of mechanical output of the internal combustion engine, and the retrofit control device detects 6C04 a signal from position sensor of the accelerator pedal, which indicates a physical position of the accelerator pedal, and regulates a regenerative braking output of the generator by the control device responsive to the accelerator pedal position signal. Further, the retrofit control device may regulate 6C02 the base load of the generator on the internal combustion engine independently of the accelerator pedal position.

The vehicle has a parking brake operable by the driver. The retrofit control device may regulate 6C08 mechanical output, of the infernal combustion engine (and load of the generator) with the vehicle stationary to provide battery recharging responsive to a predetermined recharge time, which may be user selected. The stationary charging may be conditioned upon the control device detecting that the vehicle is stationary or a signal from the position, sensor of the parking brake, which indicates a physical position, of the parking brake, i.e., parking brake on. The control device monitors stops the charging upon completion, which may be in response to battery charge or expiration of predetermined recharge time.

Figure 6D:
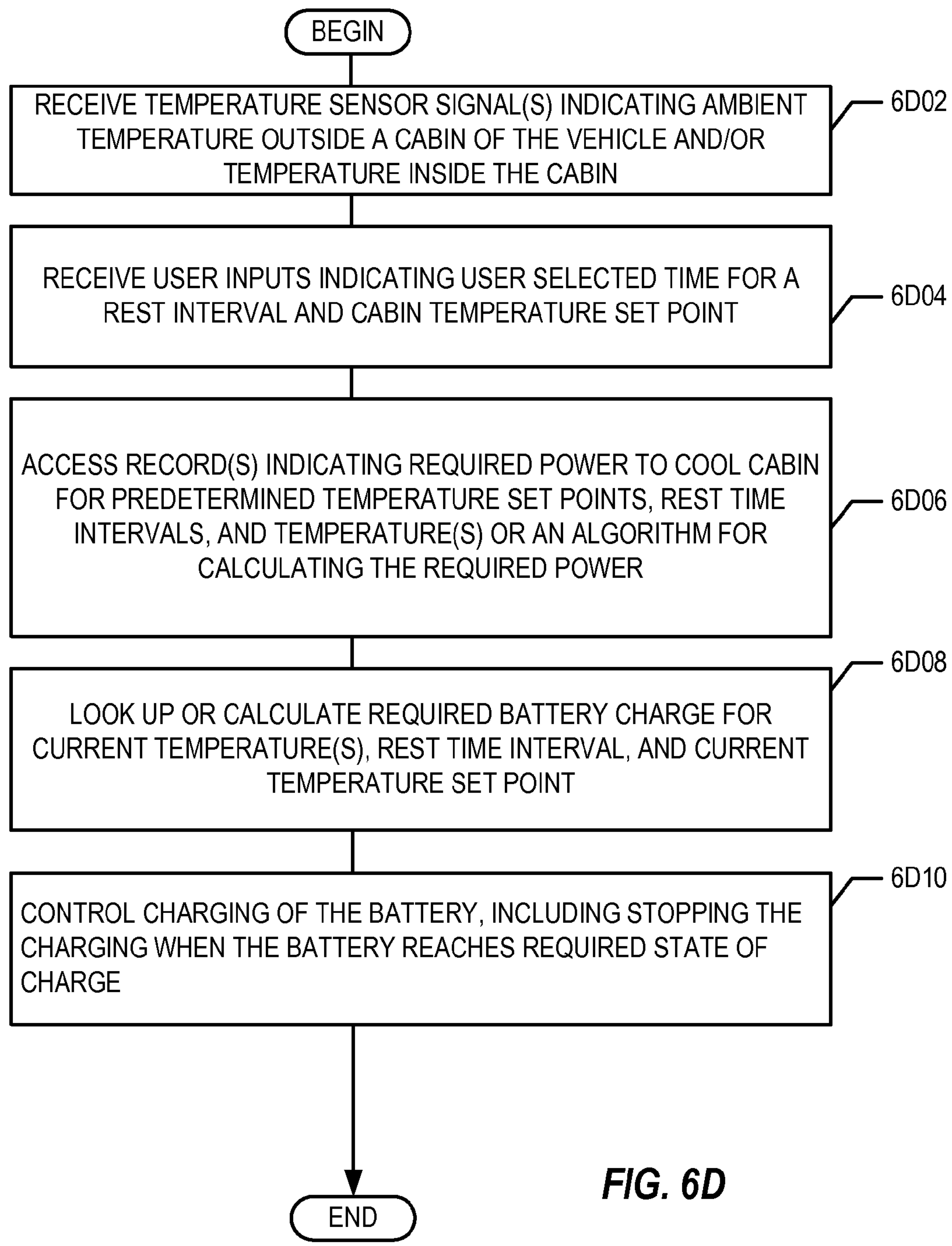
FIG. 6D illustrates battery recharging related aspects for cabin comfort for a vehicle with anti-idling features, according to embodiments of the invention.

Referring now to FIG. 6D, a flow chart illustrates farther battery recharging related aspects of vehicle 100, according to embodiments of the invention. The retrofit control device receives 6D02 temperature sensor signals indicating ambient temperature outside a cabin of the vehicle and the temperature inside the vehicle. In 6D04, the retrofit control device receives user inputs indicating user selected time for a rest interval and cabin temperature set point. The retrofit control device may access 6D06 a stored record indicating how much power is required to heat or cool the cabin for predetermined parameters including cabin temperature set point, rest time interval, and outside and inside temperatures, or may access a stored algorithm for calculating the required power as a function of the above mentioned parameters. The retrofit control device determines 6D08 (by reading the record or executing the algorithm) a required battery state of charge for the detected temperatures and for the received rest time interval and temperature set point, in an alternative, a variation of the algorithm or record may be used to determine the required battery charge without reference to a measured cabin temperature. The algorithm or record may provide the resultant required charge without the measured cabin temperature or outside temperature by including an assumed predetermined difference in outside temperature and cabin temperature. In either alternative, at least one measured temperature is used. The retrofit control device controls 6D10 charging of the battery, including stopping the charging when the battery reaches the required state of charge for the detected at least one temperature and for the received rest time interval and temperature set point.

Figure 6E:
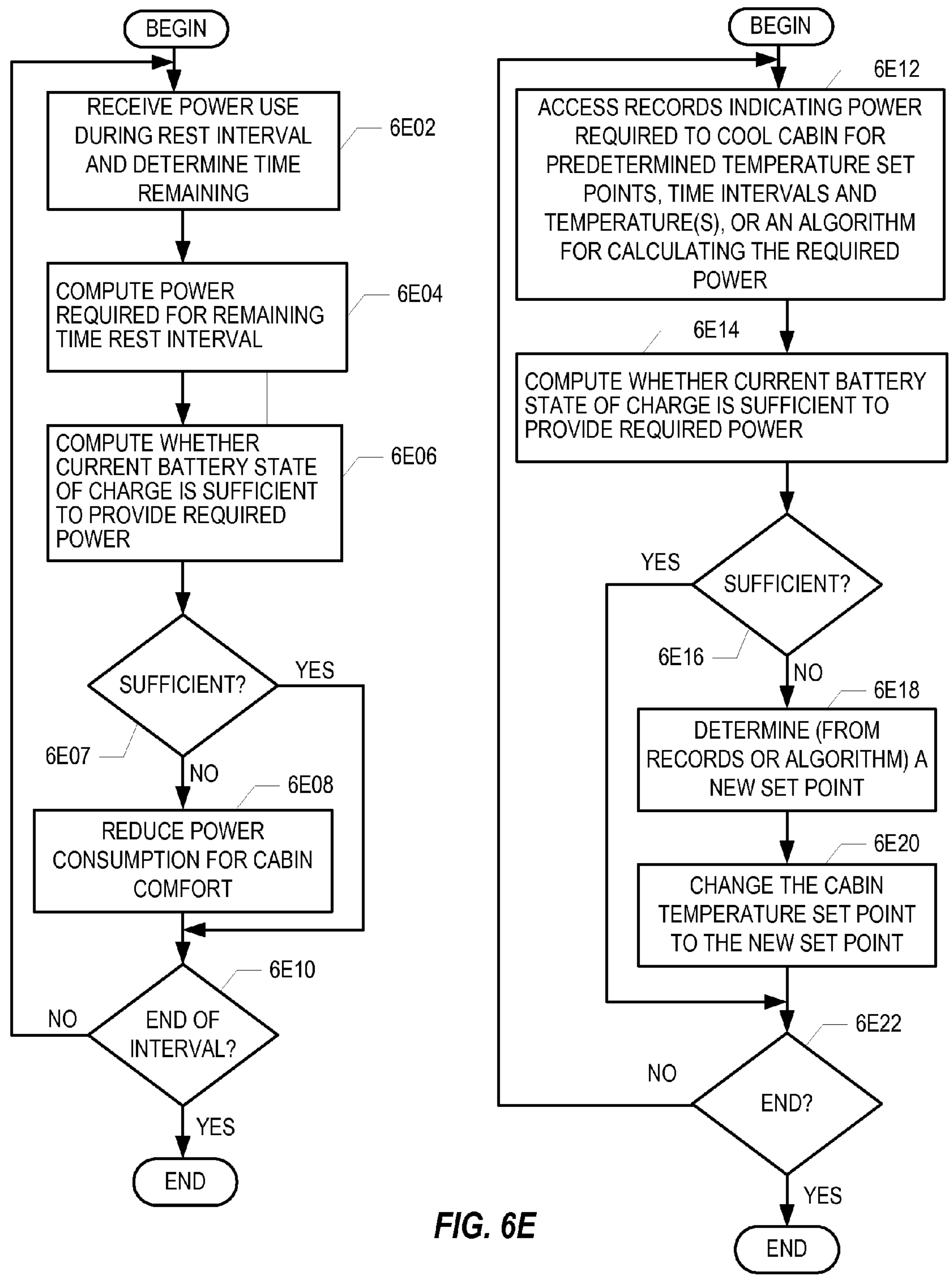
FIG. 6E illustrates cabin comfort and battery recharging aspects for a vehicle with anti-idling features, according to embodiments of the invention.

Referring now to FIG. 6E, other aspects of battery charge management are illustrated for vehicle 100, according to embodiments of the invention. This may include providing data records stored in a memory accessible by the retrofit control device indicating how much cabin comfort power is required to cool the cabin for predetermined parameters including cabin temperature set point, rest time interval, and outside temperature, or providing an algorithm, in the memory for determining the required power as a function of the predetermined parameters. The retrofit control device measures 6E02 an actual rate of power use during a user specified rest interval and determines time remaining for the rest interval. The retrofit control device computes 6E04 required power that will be used in the remaining time of the rest interval based on the measured actual rate of power use and determines whether the current battery state of charge is sufficient to provide the computed first required power. The control device receives a signal indicating actual battery power remaining and compares the required power to actual power at 6E07 and branches to 6E08 if not sufficient, or 6E10 if sufficient. The retrofit control device reduces 6E08 power consumption responsive to determining 6E07 that current battery state of charge is not sufficient to provide the computed required power. Otherwise, at 6E10, the control device determines if the rest internal has ended, such as in response to expiration of a timer or due to receiving a user input indicating early termination. If not, control branches back to 6E02. Otherwise, the rest cycle battery management algorithm of FIG. 6E ends.

In an alternative also shown in FIG. 6E, operation may include accessing 6E12 data records or an algorithm stored in a memory accessible to the retrofit control device to determine from the data records or the algorithm the required power as a function of the predetermined parameters. Then the control device computes 6E14 whether the current battery state of charge is sufficient to provide the computed required power. The control device receives a signal indicating actual battery power remaining and compares the required power to actual power at 6E16 and branches to 6E18 if not sufficient or 6E22 if sufficient. The control device determines 6E18 a new cabin temperature set point for the current temperatures remaining time interval and battery charge. The new set point reduces power use such that the power that will be used in the remaining time of the rest interval based on the reduced rate of power use is no greater than the current state of charge of the battery. At 6E20 the control device causes the cabin temperature set point to change to the new set point.

Figure 6F:
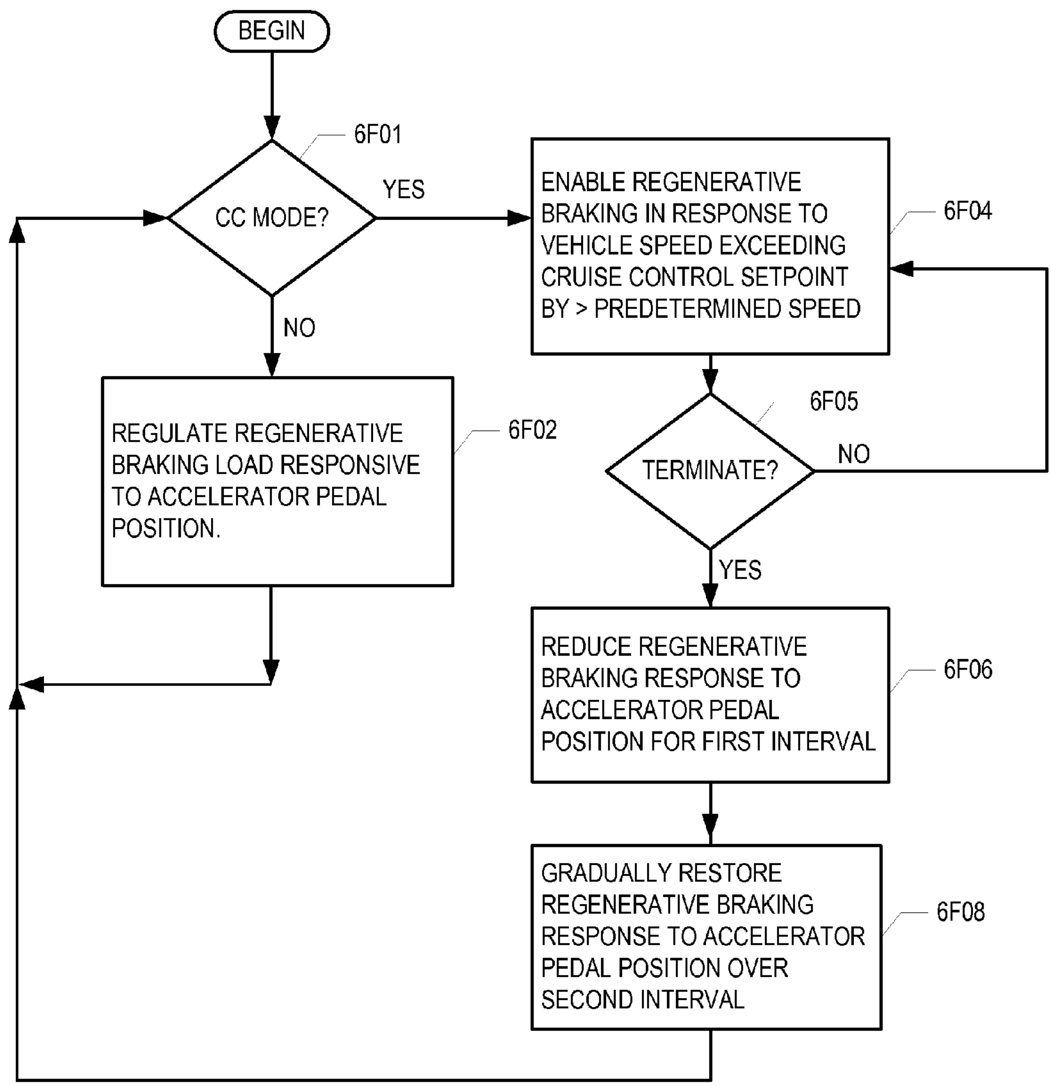
FIG. 6F illustrates certain cruise control related aspects of anti-idling and/or cabin comfort features for a vehicle with anti-idling features, according to embodiments of the invention.

Referring now to FIG. 6F, a How chart illustrates certain cruise control related aspects of vehicle 100 operation, according to embodiments of the invention. The vehicle may have a cruise controller configured for generating a cruise control torque demand signal to regulate output of the internal combustion engine responsive to vehicle speed and a cruise control set point when in a cruise control mode. The vehicle may include the retrofit control device determining 6F01 whether the cruise controller is in cruise control mode such as via communication with engine control module. The control device regulates 6F02 the regenerative braking load responsive to accelerator pedal position when the cruise controller is not in the cruise control mode. The retrofit control device disables 6F04 the regenerative braking load when the cruise controller is in the cruise control mode, unless vehicle speed exceeds the cruise control set point by more than a predetermined speed.

The retrofit control device determines 6F05 whether cruise control mode has been terminated and if not terminated continues at 6F04. Otherwise it reduces 6F06 the regenerative braking response to the accelerator pedal position for a first post-cruise control time interval after the cruise control mode is terminated. Then upon expiration first post-cruise control time interval, the retrofit control device restores 6F08 the regenerative braking response to the accelerator pedal position over a second post-cruise control time interval and then returns to 6F01, wherein the restoring is responsive to expiration of the first post-cruise control time interval.

Figure 6G:
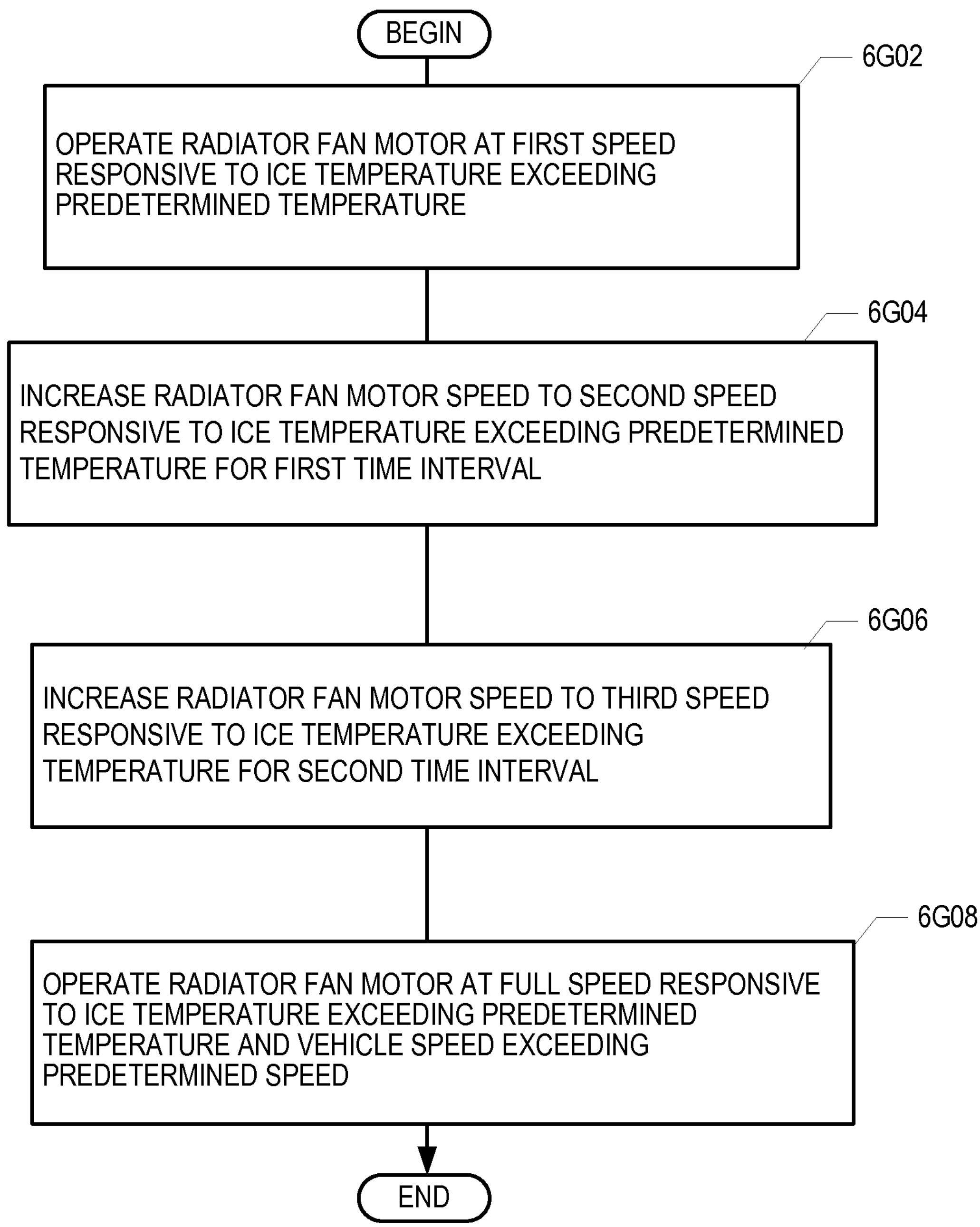
FIG. 6G illustrates certain radiator fan control related, aspects of anti-idling and/or cabin comfort features for a vehicle with, anti-idling features, according to embodiments of the invention.

Referring now to FIG. 6G, a flow chart illustrates certain radiator fan control related aspects of vehicle 100, according to embodiments of the invention. The vehicle may include 6G02 the retrofit control device energizing 6G02 a motor, i.e., operating the motor, for the radiator fan at a first speed, which may be a predetermined speed, responsive to the control device receiving a signal indicating an internal combustion engine temperature exceeds a predetermined temperature, which may be an engine coolant temperature. The retrofit control device may increase 6G04 the radiator fan motor speed to a second speed, which may be a predetermined speed, responsive to the ICE temperature continuing to exceed the first temperature for a first predetermined temperature time interval. The retrofit control device may increase 6G06 the radiator fan motor speed to a third speed, which may be a predetermined speed, responsive to ICE 150 temperature exceeding a predetermined temperature, e.g., the first or second temperature for a second predetermined time interval. The retrofit control device may operate 6G08 the radiator fan motor at full speed responsive to the ICE temperature exceeding a predetermined temperature and vehicle speed exceeding a predetermined speed. The full speed response may be immediate or after a predetermined time.

In embodiments of the invention, when regenerative braking in cruise control mode is evoked, the control device regulates regenerative braking generator load responsive to accelerator pedal position, as in non-cruise control mode, in other embodiments, the control device regulates regenerative braking in response to vehicle speed or cruise controller torque demand signal, or both, such as described herein above prior to and including the description of FIG. 4F.

As will be appreciated by one skilled in the art, aspects of the present invention may be embodied as a system, method, and/or program product. Accordingly, aspects of the present invention may take the form of an entirely hardware embodiment, an entirely software embodiment (including firmware, resident software, micro-code, etc), or embodiments combining software and hardware aspects that may all generally be referred to herein as a "circuit," "module," or "system." Furthermore, aspects of the present invention may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing. More specific examples (a non-exhaustive list) of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, controller, or device. Program, code embodied on a computer readable signal medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, controller, or device.

The flowcharts and block diagrams in the figures illustrate architecture, functionality, and operation of possible implementations of systems, methods and program products according to various embodiments of the present invention. In this regard, each block in the flowcharts or block diagrams may represent a module, segment, or portion of code, which comprises one or more executable program instructions for implementing the specified logical function(s). It should also be noted that, in some implementations, the functions noted in the blocks may occur out of the order noted in the figures. For example, two blocks shown in succession may, in feet, be executed substantially concurrently, or the blocks may sometimes be executed in the reverse order, depending upon the functionality involved.

Modules implemented in software for execution by various types of processors may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The data may provide electronic signals on a system or network.

These program instructions may be provided to a processor and/or controller of a general purpose computer, special purpose computer, or other programmable data processing apparatus (e.g., controller) to produce a machine, such that the instructions, which execute via the processor of the computer or other programmable data processing apparatus, create means for implementing the functions/acts specified in the flowchart and/or block diagram block or blocks.

It will also be noted that each block of the block diagrams, and/or flowchart illustration, and combinations of blocks in the block diagrams and/or flowchart illustration, can be implemented by special purpose hardware-based systems that perform the specified functions or acts, or combinations of special purpose hardware and computer instructions. For example, a module may be implemented as a hardware circuit comprising custom VLSI circuits or gate arrays, off-the-shelf semiconductors such as logic chips, transistors, controllers, or other discrete components. A module may also be implemented in programmable hardware devices such as field programmable gate arrays, programmable array logic, programmable logic devices or the like.

Computer program code, i.e., instructions, for carrying out operations for aspects of the present invention may be written in. any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These program instructions may also be stored in a computer readable storage medium that can direct a computer, other programmable data processing apparatus, controller, or other devices to function in a particular manner, such that the instructions stored in the computer readable medium produce an article of manufacture including instructions which implement the function/act specified In the flowchart and/or block diagram block or blocks.

The program instructions may also be loaded onto a computer, other programmable data processing apparatus, controller, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more databases may be included in a host, for storing and providing access to data for the various implementations. One skilled in the art will also appreciate that, for security reasons, any databases, systems, or components of the present invention may include any combination of databases or components at a single location or at multiple locations, wherein each database or system may include any of various suitable security features, such as firewalls, access codes, encryption, de-encryption and the like. The database may be any type of database, such as relational, hierarchical, object-oriented, and/or the like. Common database products that may be used to implement the databases include DB2 by IBM, my of the database products available from Oracle Corporation, Microsoft Access by Microsoft Corporation, or any other database product. The database may be organized in any suitable manner, including as data tables or lookup tables.

Association of certain data may be accomplished through any data, association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In these embodiments, the data corresponding to the key field in each of the merged data tables is preferably the same. However, data tables having similar, though not identical, data in the key fields may also be merged by using AGREP, for example.

Reference is made herein to "configuring" the retrofit control device, it should be understood that this may include selecting predefined logic blocks and logically associating them, such that, they provide particular logic functions, which includes monitoring or control functions. It may also include programming computer software-based logic of retrofit control device, wiring discrete hardware components, or a combination of any or all of the foregoing.

Reference throughout this specification to "one embodiment," "embodiments," or similar language means that a particular feature, structure, or characteristic described in connection with the embodiments is included in at least one embodiment of the present invention. Thus, appearances of the phrases "in one embodiment," "in an embodiment," "embodiments," and similar language throughout this specification may, but do not necessarily, all refer to the same embodiment. Furthermore, the described features, structures, aspects, and/or characteristics of the invention may be combined in any suitable manner in one or more embodiments. Correspondingly, even if features may be initially claimed as acting in certain combinations, one or more features from a claimed combination, can in some cases be excised from the combination, and the claimed combination can be directed to a sub-combination or variation of a sub-combination.

In the descriptions herein, numerous specific details are provided, such, as examples of programming, software modules, user selections, network transactions, database queries, database structures, hardware modules, hardware circuits, hardware chips, controllers, etc., to provide a thorough understanding of embodiments of the invention. One skilled in the relevant art will recognize, however, that the invention may be practiced without one or more of the specific details, or with other methods, components, materials, and so forth, In other instances, well-known structures, materials, or operations may be not shown or described in detail to avoid obscuring aspects of the invention.

Figure 7:
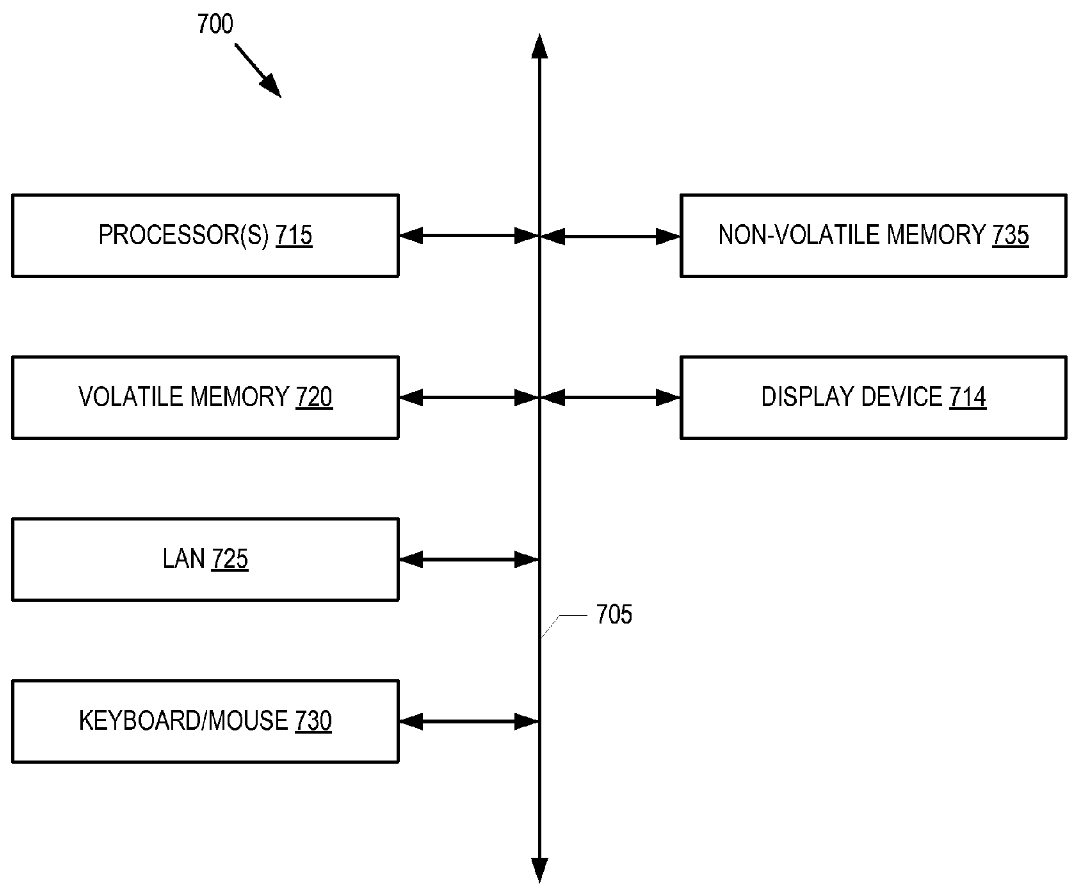
FIG. 7 illustrates a computer system for controlling a vehicle, according to embodiments of the invention.

With reference now to FIG. 7, a block diagram illustrating a computer system is depicted in which aspects of embodiments of the invention may be implemented. Computer system 700 may employ a peripheral component interconnect (PCI) local bus architecture. Although the depicted example employs a PCI bus, other bus architectures such as Accelerated Graphics Port (AGP) and Industry Standard Architecture (ISA) may be used, among others. Processor 715, volatile memory 720, and non-volatile memory 735 may be connected to PCI local bus 705 through PCI Bridge (not shown). The PCI Bridge also may include an integrated memory controller and cache memory for processor 715, Additional connections to PCI local bus 705 may be made through direct component interconnection or through add-in boards. In the depicted example, a network (LAN) adapter 725, small computer system interface (SCSI) host bus adapter (not shown), and expansion bus interface (not shown) may be connected to PCI local bus 705 by direct component connection. In contrast, audio adapter (not shown), graphics adapter (not shown), and audio display adapter 714 maybe connected to PCI local bus 705 by add-in boards inserted into expansion slots.

Expansion bus interface (not shown) provides a connection for a keyboard and mouse adapter 730, modem (not shown), and additional memory (not shown), SCSI host, bus adapter (not, shown) provides a connection for a hard disk drive, tape drive, and CD-ROM drive. Typical PCI local bus implementations will support three or four PCI expansion slots or add-in connectors.

An operating system may be run on processor 715 and used to coordinate and provide control of various components within computer system 700 in FIG. 7 the operating system may be a commercially available operating system. An object oriented programming system such as Java may run in conjunction with the operating system and provide calls to the operating system from Java programs or programs executing on system 700. Instructions for the operating system, the object-oriented operating system, and programs may be located on non-volatile memory 735 storage devices, such as a hard disk drive, and may be loaded info volatile memory 720 for execution by processor 715.

Those of ordinary skill in the art will appreciate that the hardware in FIG. 7 may vary depending on the implementation. Other internal hardware or peripheral devices, such as flash ROM (or equivalent nonvolatile memory) or optical disk drives and the like, may be used in addition to or in place of the hardware depicted in FIG. 7. Also, the processes of the present invention may be applied to a multiprocessor computer system.

As another example, computer system 700 may be a stand-alone system configured to be bootable without relying on some type of network communication interface, whether or not computer system 700 includes some type of network communication interface. As a further example, computer system 700 may be an embedded controller, which, is configured with ROM and/or Hash ROM providing non-volatile memory storing operating system files or user-generated data.

The depicted example in FIG. 7 and above-described examples are not meant to imply architectural limitations. Further, a computer program form of the present invention may reside on any computer readable storage medium (i.e., floppy disk, compact disk, hard disk, tape, ROM, RAM, etc.) used by a computer system. (The terms "computer," "system," and "computer system" may be used interchangeably herein.)

Benefits, advantages and solutions to problems have been described above with regard to specific embodiments. However, the benefits, advantages, solutions to problems, and any elements) that, may cause any benefit, advantage, or solution to occur or become more pronounced may be not to be construed as critical, required, or essential features or elements of any or all the claims.

Those skilled in the art having read this disclosure will recognize that changes and modifications may be made to the embodiments without departing from the scope of the present invention, it should be appreciated that the particular implementations shown and described herein may be illustrative of the invention and its best mode and may be not intended to otherwise limit the scope of the present invention in any way. Other variations may be within the scope of the following claims.

While this specification contains many specifics, these should not be construed as limitations on the scope of the invention or of what can be claimed, but rather as descriptions of features specific to particular implementations of the invention. Headings herein may be not intended to limit the invention, embodiments of the invention or other matter disclosed under the headings.

As used herein, the terms "comprises;" "comprising," or any other variation thereof, may be intended to cover a non-exclusive inclusion, such that, a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

Herein, the term "or" may be intended to be inclusive, wherein "A or B" includes A or B and also includes both A and B.

The terminology used herein is for the purpose of describing particular embodiments only and is not intended to be limiting of the invention. As used herein, the singular forms "a," "an," and "the" may be intended to include the plural forms as well, unless the context clearly indicates otherwise, it will be further understood that the terms "comprises" and/or "comprising," when used in this specification, which may include the claims herein below, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below may be intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will foe apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as may be suited to the particular use contemplated.

What is claimed is:

1. A method of retrofitting a vehicle having a drive train and an internal combustion engine coupled to a manual transmission of the drive train suitable for propelling the vehicle, and the vehicle having a radiator suitable for cooling the internal combustion engine, the method comprising: installing a battery; installing auxiliary devices suitable for operating auxiliary systems of the vehicle, the auxiliary devices including an air-conditioning coolant compressor and a fan for the radiator; installing electric drivers for the auxiliary devices, wherein the electric drivers are configured for being energized by the battery; installing an electric generator; installing a battery charger wherein the battery is suitable for being energized by the generator via the battery charger; and coupling the electric generator to the internal combustion engine via an external connection of the internal combustion engine or to the manual transmission via an external connection of the manual transmission suitable for driving the generator; wherein the vehicle has a clutch in the drive train configured for disengaging the internal combustion engine from the manual transmission responsive to a clutch pedal being depressed, the method further comprising: connecting a control device suitable to receive a clutch pedal position sensor signal and a vehicle speed sensor signal; and configuring the control device to automatically shut off the internal combustion engine in response to detecting an idling condition, wherein the idling condition includes a first condition wherein the control device receives a signal from the vehicle speed sensor indicating the vehicle is in a stationary state and a second condition wherein the control device receives a signal from the clutch pedal position sensor indicating the clutch pedal is in a released state; further comprising configuring the control device to automatically generate a notification to a driver responsive to detecting a condition wherein the vehicle has been in a stationary state for a predetermined time interval and wherein the clutch pedal been has not been released during the predetermined time interval.

2. The method as recited in claim 1, wherein the coupling of the electric generator to the manual transmission via an external connection is via a power takeoff port of the manual transmission.

3. The method as recited in claim 1, wherein the coupling of the electric generator to the internal combustion engine via an external connection is via a cog belt.

4. The method as recited in claim 1, wherein installing the auxiliary devices includes installing an air compressor for vehicle brakes and wherein installing the electric drivers for the auxiliary devices includes installing an electric driver for the air compressor, wherein the vehicle has an air compressor drive gear coupled to the internal combustion engine, wherein the coupling of the electric generator to the internal combustion engine via an external connection is via the air compressor drive gear, and wherein the internal combustion engine drives the electric generator via the air compressor drive gear instead of driving the air compressor.

5. The method as recited in claim 1, further comprising installing at least one electric converter configured for being energized by the battery, wherein the electric drivers are configured for being energized by the battery via the at least one electric converter.

6. The method as recited in claim 1, further comprising removing mechanical drive connections from the internal combustion engine to an OEM air conditioning coolant compressor and an OEM engine-cooling radiator fan.

7. The method as recited in claim 1, wherein the idling condition detected by the control device further includes a third condition wherein a predetermined time interval has expired after the first or second condition.

8. The method as recited in claim 1, further comprising configuring the control device to automatically restart the internal combustion engine responsive to receiving a signal from a clutch pedal position sensor indicating the clutch pedal is depressed.

9. The method as recited in claim 1, further comprising configuring the control device to automatically activate an alarm responsive to detecting a condition wherein the vehicle has been in a stationary state for a predetermined time interval and wherein the clutch pedal has not been released during the predetermined time interval.

10. The method as recited in claim 1, further comprising configuring a control device to regulate a base load of the electric generator to provide a base rate of battery recharging responsive to a user selected recharge time interval.

11. The method as recited in claim 1, wherein the vehicle has an accelerator pedal configured for driver control of mechanical output of the internal combustion engine, the method further comprising configuring a control device to regulate a regenerative braking output of the electric generator responsive to a signal from an accelerator pedal position sensor indicating a physical position of the accelerator pedal.

12. The method as recited in claim 1, wherein the vehicle has an accelerator pedal configured for driver control of mechanical output of the internal combustion engine, the method further comprising:

configuring a control device to regulate a base load of the electric generator to provide a base rate of battery recharging responsive to a predetermined recharge time interval;

configuring the control device to regulate a regenerative braking output of the electric generator responsive to a signal from an accelerator pedal position sensor indicating a physical position of the accelerator pedal; and configuring the control device to regulate the base load of the electric generator, wherein the base rate of battery recharging is maintained essentially independent of the accelerator pedal position.

13. The method as recited in claim 1, further comprising configuring a control device to regulate the electric generator to provide a predetermined battery recharging rate responsive to a user selected charge rate and responsive to detection of permissive conditions.

14. The method as recited in claim 11, wherein the vehicle has a cruise controller configured for generating a cruise control torque demand signal when in a cruise control mode to regulate output of the internal combustion engine responsive to vehicle speed and a cruise control set point, the method further comprising:

configuring the control device such that the regenerative braking output is responsive to accelerator pedal position when the cruise controller is not in the cruise control mode; and configuring the control device to, when the cruise controller is in the cruise control mode, regulate the regenerative braking load in response to i) a decrease in the cruise control torque demand signal and ii) a vehicle speed greater than the cruise control set point.

15. The method as recited in claim 14, further comprising configuring the control device to provide a reduced regenerative braking response to the accelerator pedal position for a first post-cruise control time interval after the cruise control mode is terminated.

16. The method as recited in claim 15, further comprising configuring the control logic to, in response to expiration of the first post-cruise control time interval, restore the regenerative braking response to the accelerator pedal position over a second post-cruise control time interval.

17. The method as recited in claim 1, further comprising configuring a control device to energize a motor for the radiator fan at a first predetermined speed responsive to internal combustion engine temperature exceeding a predetermined temperature.

18. The method as recited in claim 17, further comprising configuring the control device to increase a motor speed for the radiator fan to a second predetermined speed responsive to the internal combustion engine temperature continuing to exceed the predetermined temperature for a first predetermined temperature time interval.

19. The method as recited in claim 18, further comprising configuring the control device to operate the motor for the radiator fan at full speed responsive to the internal combustion engine temperature exceeding the predetermined temperature and vehicle speed exceeding a predetermined speed.

20. The method as recited in claim 1, further comprising:

coupling a temperature sensor to a control device, wherein the temperature sensor is suitable to measure ambient temperature outside a cabin of the vehicle;

providing i) records stored in a memory accessible by the control device, the records indicating how much power is required to heat or cool the cabin for predetermined parameters including cabin temperature set point, rest time interval, and outside temperature, or ii) an algorithm stored in the memory for calculating the required power as a function of the predetermined parameters;

configuring the control device to receive user inputs indicating a user selected time for a rest interval and cabin temperature set point; and configuring the control device to control charging of the battery, wherein the control device stops the charging when the battery reaches a required battery state of charge for a detected outside ambient temperature and the received rest time interval and temperature set point.

21. The method as recited in claim 1, further comprising:

providing i) records stored in a memory accessible by a control device indicating how much cabin comfort power is required to cool a cabin of the vehicle for predetermined parameters including cabin temperature set point, rest time interval, and outside temperature, or ii) providing an algorithm in the memory for calculating the required power as a function of the predetermined parameters;

configuring the control device to measure an actual rate of power use during a user specified rest interval and time remaining for the rest interval;

configuring the control device to determine first required power that will be used in the time remaining for the rest interval based on the measured actual rate of power use;

configuring the control device to determine whether a current battery state of charge is sufficient to provide the determined first required power; and configuring the control device to reduce power consumption responsive to determining that the current battery state of charge is not sufficient to provide the determined first required power.

22. The method as recited in claim 21, further comprising configuring the control device to determine from the records or the algorithm a new cabin temperature set point for a current outside ambient temperature and time remaining for the rest interval, wherein the new cabin temperature set point reduces power use such that the power that will be used in the time remaining for the rest interval based on a reduced rate of power use that is no greater than the current battery state of charge, wherein reducing the power use includes the control device causing the cabin temperature set point to change to the new cabin temperature set point.

* * * * *